United States Patent [19]

Chelminski

[11] Patent Number: 4,712,641

[45] Date of Patent: Dec. 15, 1987

[54] METHOD AND SYSTEM FOR GENERATING SHEAR WAVES AND COMPRESSION WAVES IN THE EARTH FOR SEISMIC SURVEYING

[75] Inventor: Stephen V. Chelminski, West Redding, Conn.

[73] Assignee: Bolt Technology Corporation, Norwalk, Conn.

[21] Appl. No.: 653,438

[22] Filed: Sep. 21, 1984

Related U.S. Application Data

[63] Continuation-in-part of Ser. No. 590,723, Mar. 19, 1984, abandoned.

[51] Int. Cl.[4] .................... G01V 1/04; G01V 1/02; G01V 1/00; H04R 1/02
[52] U.S. Cl. .................................. 181/113; 181/114; 181/119; 181/120; 181/401; 367/75; 367/144
[58] Field of Search .............. 181/111, 113, 114, 115, 181/116, 117, 118, 119, 120, 121, 401, 402, 403; 367/75, 141, 144, 145, 146, 189, 190

[56] References Cited

U.S. PATENT DOCUMENTS 3,310,128  3/1967  Chelminski ................ 181/114 X
3,376,723  4/1968  Chelminski ..................... 72/56
3,548,630 12/1970  Chelminski .................... 72/430

(List continued on next page.)

Primary Examiner—Deborah L. Kyle
Assistant Examiner—Brian S. Steinberger
Attorney, Agent, or Firm—Parmelee, Bollinger & Bramblett

[57] ABSTRACT

A seismic source is disclosed which is particularly useful for generating horizontally polarized shear waves in the earth for seismic surveying. It comprises an elongated, hollow, substantially vertical cylinder having an earth-contacting pad pivotally mounted to its lower end by a horizontal pivot shaft extending parallel with the front-to-back centerline of a transport vehicle. The lower surface of this large rigid pad contains multiple, blade-like teeth extending parallel with the pivot shaft for gripping the earth's surface for transmitting powerful horizontally polarized shear stress impulses into the earth. The cylinder contains a slidable piston-like reaction mass. The bottom of the cylinder is a strong upwardly diverging conical surface serving to focus and direct upwardly the discharge blast from each port of an air gun extending horizontally and with the axis of the air gun being oriented parallel with the pivot axis and being located a short distance above the pivot shaft. Thus, the cylinder bottom is defined by the intersection of an elongated cylinder with a truncated cone and each air gun port is located near the center of the upwardly facing cone for focusing the blast upwardly toward the reaction mass. A small amount of water below the reaction piston mass and above the conical bottom surrounds the air gun ports. The air gun is selectively discharged to forcibly drive the earth-contacting pad down. By inclining the cylinder to the left of vertical or to the right of vertical while the pad seats on the earth with its parallel blade-like teeth gripping the earth's surface, the resulting sudden downward angled thrust is transmitted into the earth to generate horizontally polarized shear waves in addition to compression waves. The entire assembly is mounted on a transporter, such as a truck or log-skidder from which it may be lowered against the earth's surface as desired. The transporter carries a prime mover, an air compressor and receiver tank, and an air/water separator for the operation of the shear wave generator. A seismic survey method includes progressing from shot point to shot point along a seismic survey line, and at each shot point the cylinder is stood upright, is inclined to the left and is inclined to the right, in any desired sequence, and the air gun is fired with the cylinder in each of these attitudes for generating predetermined sequences and mixtures of compressional (P) waves, vertically polarized shear (SV) waves, left-handed horizontally polarized shear (SH) waves, and right-handed horizontally polarized shear (SH) waves thereby enhancing the ability to employ seismic energy transmitted into the earth from its surface for acquiring information about geological features in the earth.

58 Claims, 21 Drawing Figures

U.S. PATENT DOCUMENTS

| | | | |
|---|---|---|---|
| 3,604,519 | 9/1971 | Chelminski | 173/1 |
| 3,620,328 | 11/1971 | Coburn | 181/114 |
| 3,646,598 | 2/1972 | Chelminski | 61/53.5 |
| 3,657,917 | 4/1972 | Chelminski | 72/453 |
| 3,714,789 | 2/1973 | Chelminski | 61/53.5 |
| 3,721,095 | 3/1973 | Chelminski | 61/53.5 |
| 3,750,609 | 8/1973 | Chelminski | 114/206 A |
| 3,788,402 | 1/1974 | Chelminski | 173/91 |
| 3,817,335 | 6/1974 | Chelminski | 173/127 |
| 3,958,647 | 5/1970 | Chelminski | 173/127 |
| 4,049,078 | 9/1977 | Paitson et al. | 181/113 X |
| 4,056,164 | 11/1977 | Johnston | 181/114 |
| 4,059,820 | 11/1977 | Turpening | 367/75 X |
| 4,182,428 | 1/1980 | Savit | 181/114 |
| 4,244,437 | 1/1981 | Fulkerson | 181/114 |
| 4,296,828 | 10/1981 | Layotte et al. | 367/75 |
| 4,298,086 | 11/1981 | Pritchett | 181/113 |
| 4,321,981 | 3/1982 | Waters | 367/189 |
| 4,334,591 | 6/1982 | Martin | 181/114 |
| 4,354,572 | 10/1982 | Martin | 181/116 |
| 4,377,355 | 3/1983 | Chelminski | 405/232 |
| 4,383,582 | 5/1983 | Chelminski | 173/131 |
| 4,421,198 | 12/1983 | Miller | 181/114 X |
| 4,597,464 | 7/1986 | Chelminski | 181/401 |
| 4,608,675 | 8/1986 | Chelminski | 367/144 X |
| 4,609,066 | 9/1986 | Layotte et al. | 181/114 X |

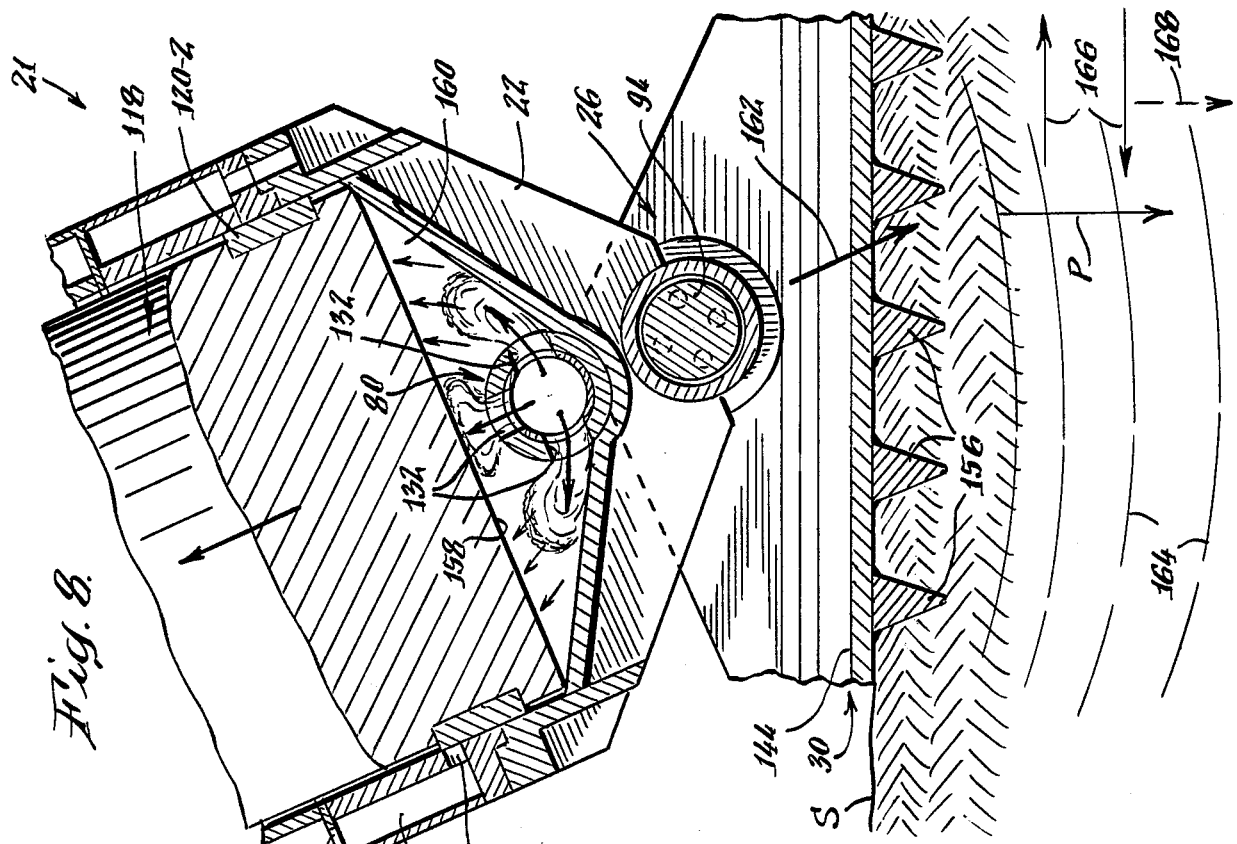
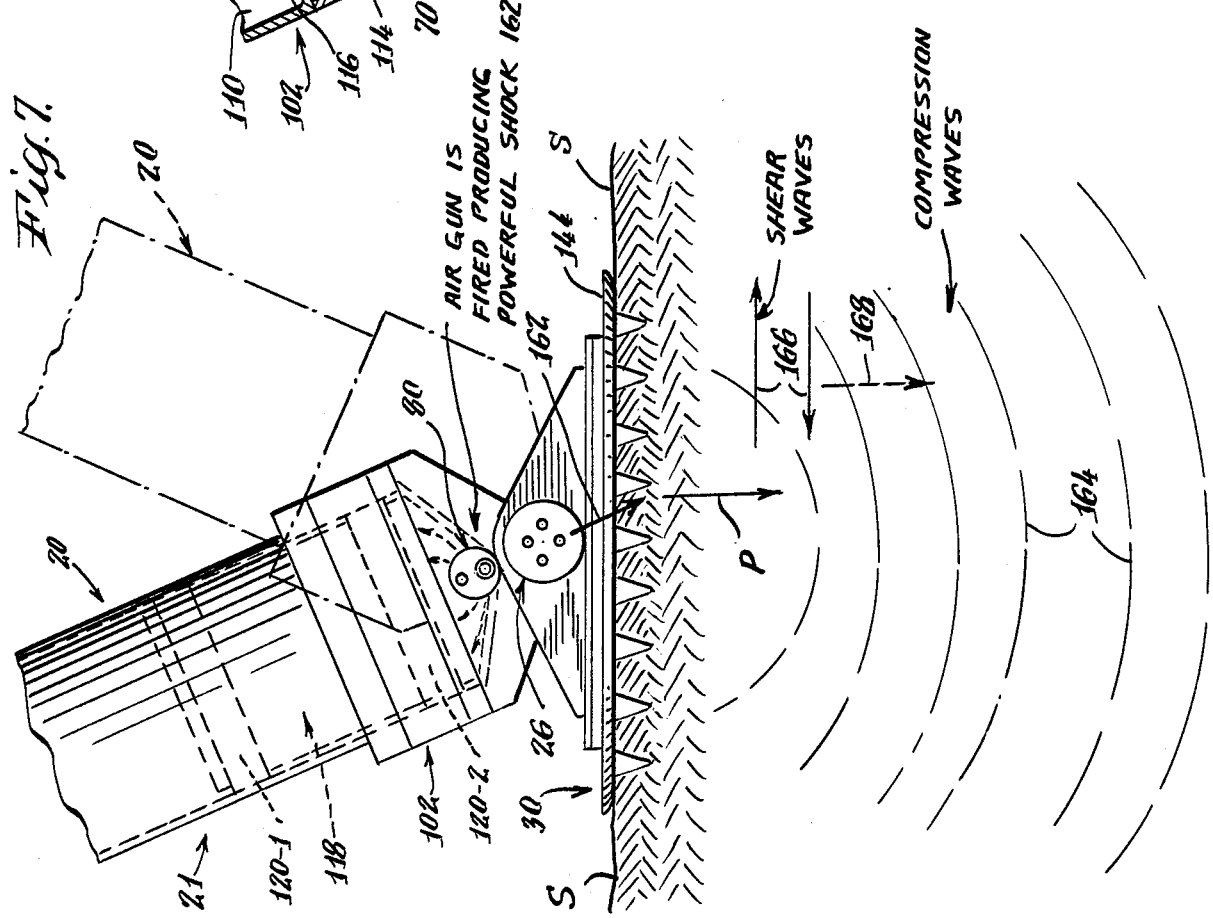

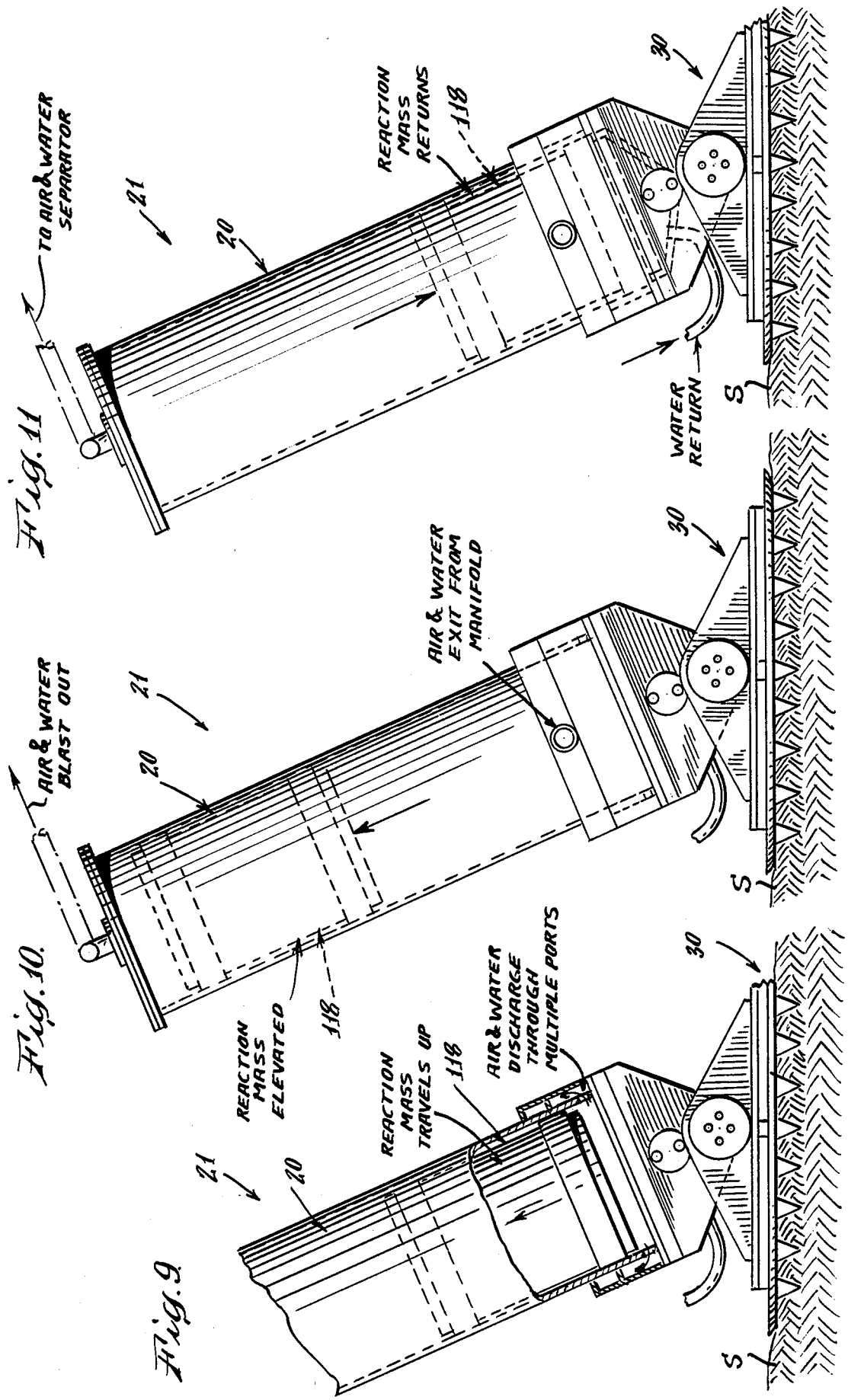

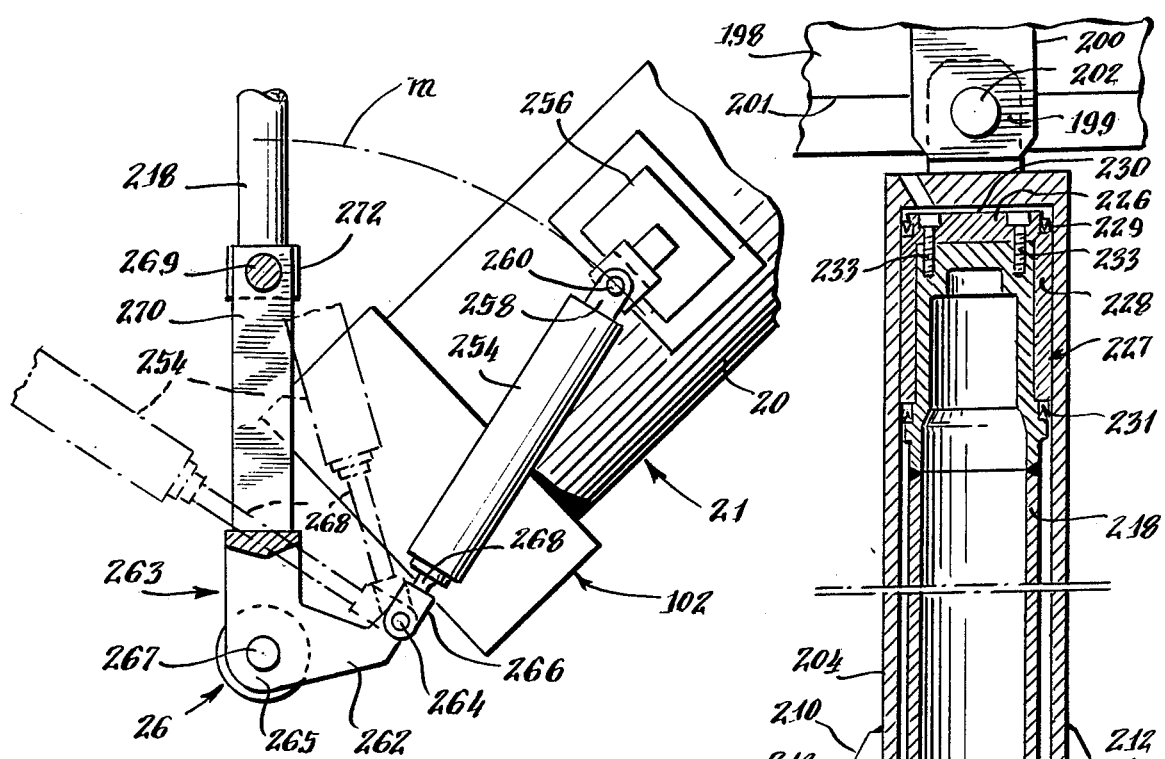
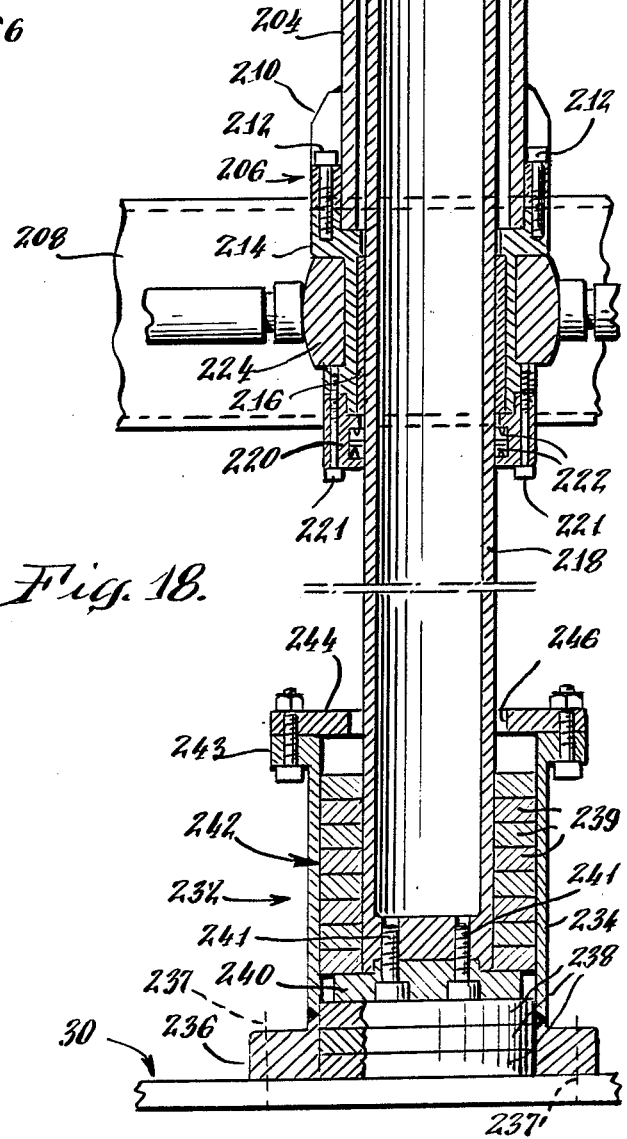
Fig. 17.
Fig. 18.

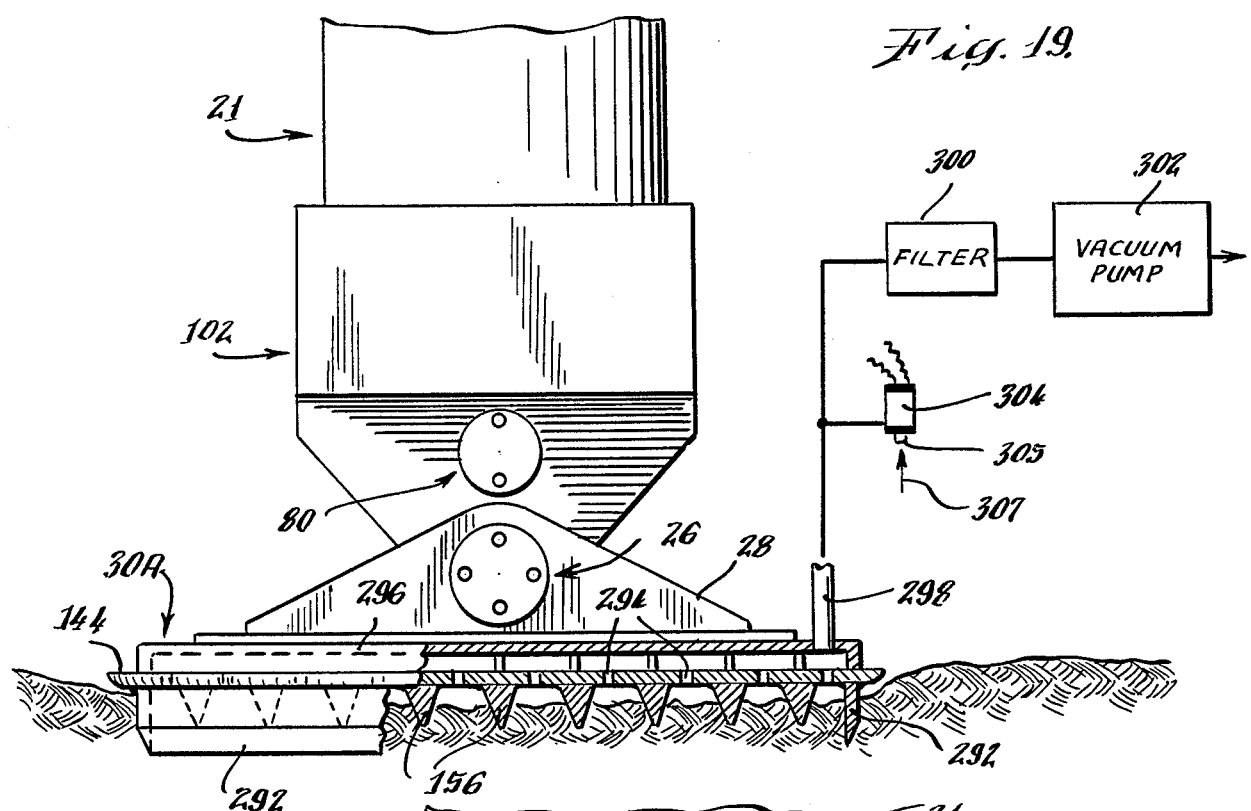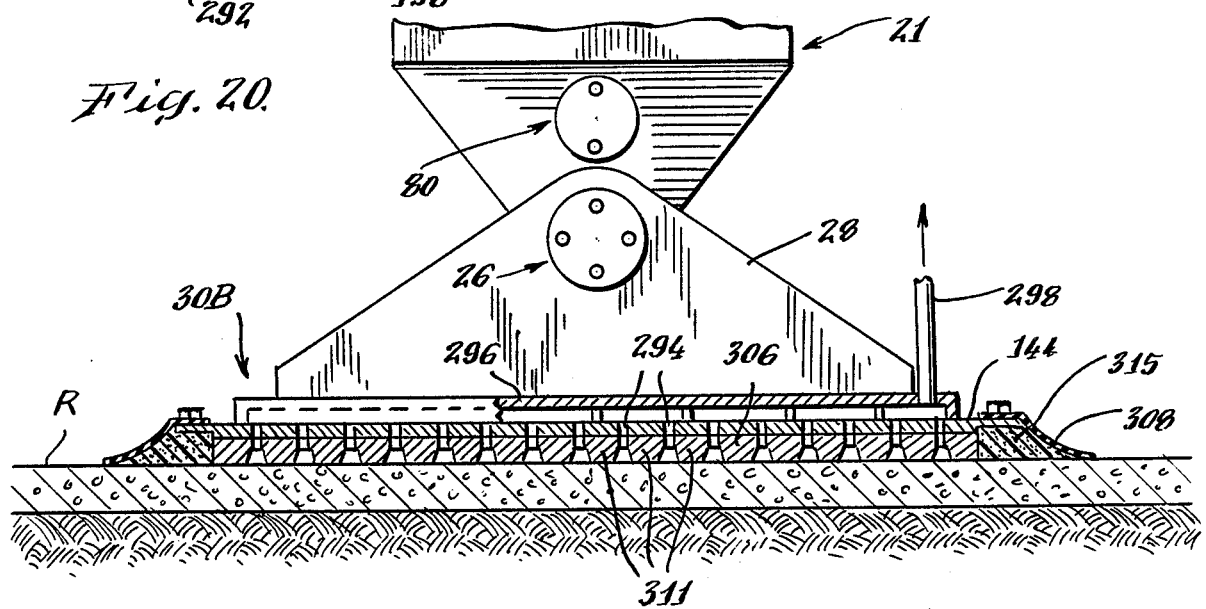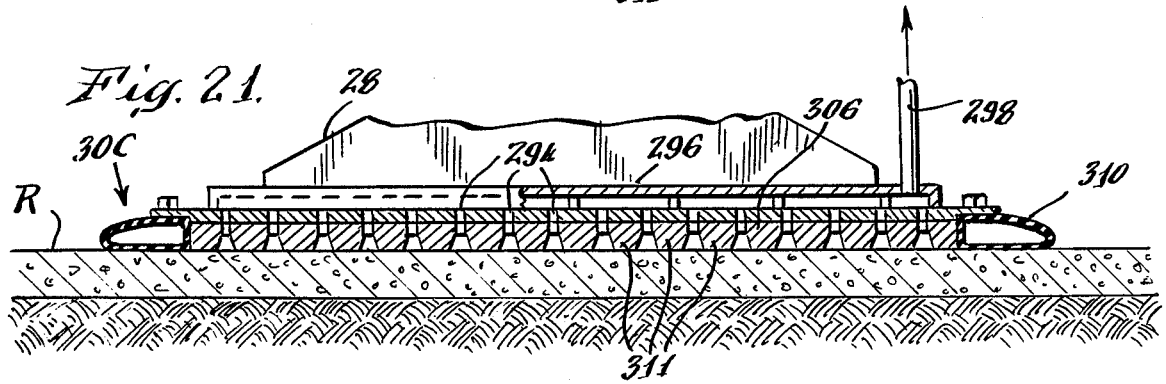

METHOD AND SYSTEM FOR GENERATING SHEAR WAVES AND COMPRESSION WAVES IN THE EARTH FOR SEISMIC SURVEYING

RELATED APPLICATION

This application is a continuation-in-part of U.S. application Ser. No. 590,723, filed Mar. 19, 1984 by the inventor herein, now abandoned.

BACKGROUND OF THE INVENTION

Seismic surveying of the earth has been done for a number of years, particularly in the field of petroleum and gas exploration. The original seismic souce was an explosive, such as dynamite or TNT, which was detonated in a bore hole. The compressional seismic waves would be reflected or refracted by geologic structures within the earth. An array of sensitive geophones located at predetermined positions on the surface of the earth at various distances from the bore hole were responsive to the reflected and refracted waves, and the resultant electrical signals from those geophones were recorded and interpreted to yield much useful information.

There are many drawbacks in the use of explosives, including safety, cost of drilling bore holes and length of time needed to drill them, cost of explosives themselves and lack of repeatability. If a second and equal-size charge of explosives is detonated in the same bore hole, the resultant seismic waves will be different from the original waves, because the bore hole was distorted by the first explosion. Accordingly, explosives have, in many cases, been supplanted by alternate energy surface sources, such as those employing the "air gun". An air gun suddenly releases a charge of pressurized gas, usually compressed air, with powerful explosive-like abruptness, and this discharge can be predictably repeated time after time after time. Air guns have been incorporated in land seismic energy surface sources, examples being those disclosed and claimed in the following U.S. patents:

U.S. Pat. No. 3,310,128
U.S. Pat. No. 3,779,335
U.S. Pat. No. 3,800,907
U.S. Pat. No. 4,108,271 and
U.S. Pat. No. 4,316,521.

These land seismic energy surface sources have included a tank, which in the last four of these patents is in the shape of an inverted dome. The tank is provided with a displaceable diaphragm bottom to contain an incompressible liquid such as water. One or more air guns are positioned within the tank and receive and store pressurized air, or other suitable gas, under high pressure supplied from a source such as the receiver chamber or pressure tank of a high pressure air compressor. The last three of these patents show a metal pan positioned between the diaphragm and the earth so that, upon the abrupt release of the high pressure gas from the air gun into the liquid, the flexible diaphragm suddenly thrusts down on the metal pan to suddenly thrust down on the portion of the earth beneath the pan and thereby produce a powerful seismic impulse. One of the aforementioned patents (U.S. Pat. No. 4,316,521) discloses the concept of inclining the entire generating assembly away from the vertical in order to accommodate local variations in the slope of the earth's surface. In each of the land seismic sources shown in these patents thè seismic energy which is transmitted into the earth mainly is in the form of compressional (P) waves.

Geophysicists would like to produce shear (SH) waves in the earth in order to obtain considerable valuable additional information beyond that which can be obtained from compressional (P) waves alone. While some of the seismic energy transmitted into the earth by the above land surface sources is incidentally in the form of vertically polarized shear (SH) waves generated in the earth near the perimeter of the metal pan caused by sudden downward compressive thrust of the pan on the earth beneath the pan relative to the surrounding uncompressed earth, such incidental vertically polarized shear (SV) waves do not provide much significant useful information beyond that resulting from the powerful compressional (P) waves themselves.

One technique which has been employed in the past to obtain horizontally polarized shear (SH) waves has been to find or construct a relatively steep bank of earth. The seismic source is then tilted so as to direct its energy into the slanted surface of the bank, whereby the thrust is applied in a direction more nearly parallel with the earth's surface for generating SH waves. It will be understood that such a method of constructing steep earth banks is expensive in man-hours and also requires a great deal of work to restore the surface of the earth to its original condition.

Another approach to shear wave production utilizes a hydraulically-driven vibrator apparatus which rests upon the earth's surface and oscillates horizontally. This horizontal "shaking" motion is effective in producing horizontally polarized shear (SH) waves. However, such vibrator-produced SH waves are generated at the cost and limitations of providing a very expensive seismic source which will not produce compression waves when they are desired. Therefore, if is desired to carry out a seismic survey along a particular survey line employing both P waves and SH waves to obtain data resulting from both kinds of waves, it is necessary to utilize another seismic energy surface source in addition to such a horizontal vibrator. The use of such a second surface source to obtain P wave data entails a second operating crew with attendant costs in time and labor. If the second source and crew are not immediately available, then time will inevitably elapse before the second source is operated along that same survey line. It turns out that the characteristics of the uppermost tens of feet of the earth, that top surface layer being called the "weathering layer", change from day-to-day as a result of weather action. Consequently, when a significant time period has elapsed between the two crews' operations, such as a few days during which a storm has occurred, the weathering layer will have changed. Thus, the P wave data acquired by the second crew will not be directly correlatable with the SH wave data acquired by the first crew, since the weathering layer of the earth has changed in the intervening time period.

It is an object of the present invention to provide a seismic energy surface source capable of generating SH shear waves in the earth without regard to the local variability of the surface slope. Other objects are to provide such apparatus wherein the direction of initial thrust in generating SH waves can be easily controlled and wherein the same apparatus may be employed to produce either compression (P) or shear (SH) waves or both, and the relative proportions of P waves and SH waves to be generated can be varied easily and also wherein left-handed and right-handed SH waves can be generated. The manner in which the foregoing objects are achieved will become understood from the following description and from the appended claims.

SUMMARY OF THE INVENTION

In accordance with the present invention, there is provided an apparatus for generating shear SH and compression P waves in the earth for seismic surveying. This apparatus includes a transporter which is movable across the earth's surface and carries a substantially vertical elongated hollow cylinder having closed upper and lower ends. An earth-contacting pad is pivotally mounted to the lower end of the cylinder by a horizontal pivot shaft extending in a direction parallel with the front-to-back centerline of the transport vehicle. This pivot shaft and the mounting on the transporter enable the cylinder to be oriented upright, to be inclined to the left at various angles, and to be inclined to the right at various angles. The lower surface of this large rigid pad contains multiple, blade-like teeth extending parallel with the pivot shaft, for gripping the earth's surface for transmitting powerful horizontally polarized shear stress impulses into the earth. The cylinder contains a slidable piston-like reaction mass. The bottom of the cylinder is a strong upwardly diverging conical surface serving to focus and direct upwardly the discharge blast from each port of an air gun. This air gun extends horizontally, with the axis of the air gun being oriented parallel with the pivot axis and being located a short distance above the pivot shaft. Thus, the cylinder bottom is defined by the intersection of an elongated cylinder in which the air gun is located and a cone. Each air gun port is located near the center of the upwardly facing cone for focusing the blast upwardly toward the reaction mass. A small amount of water below the reaction piston mass and above the conical bottom surrounds the air gun ports and fills the volume between the reaction mass and the conical bottom. The air gun is selectively discharged to forcibly drive the earth-contacting pad down while the reaction mass moves up in the cylinder. By inclining the cylinder to the left of vertical or to the right of vertical while the pad seats on the earth with its parallel blade-like teeth embedded into and gripping the earth's surface, the resulting sudden downward angled thrust is transmitted into the earth to generate horizontally polarized shear (SH) waves in addition to compression (P) waves. The entire assembly is mounted on a transporter, such as a truck or log-skidder from which it may be lowered against the earth's surface as desired. The transporter carries a prime mover, an air compressor and a receiver tank for supplying high pressure air to the air gun, and an air/water separator separating the water from the air after each discharge of the air gun. A seismic survey method includes progressing from shot point to shot point along a seismic survey line, and at each shot point the cylinder is stood upright, is inclined to the left and is inclined to the right, in any desired sequence, and the air gun is fired while the cylinder is oriented in each of these attitudes for generating predetermined sequences and mixtures of compressional (P) waves, left-handed horizontally polarized shear (SH) waves and right-handed horizontally polarized shear (SH) waves, thereby enhancing the ability to employ seismic energy transmitted into the earth from its surface for acquiring information about geological features in the earth.

BRIEF DESCRIPTION OF THE DRAWINGS

The foregoing and other aspects, objects, features and advantages of the invention will become more fully understood from the following description of a preferred embodiment of the invention as illustrated in the accompanying drawings, in which like reference characters refer to the same parts throughout the different views. The drawings are not necessarily to scale, emphasis instead being placed upon illustrating the principles of the invention.

FIG. 7 is an elevational view of the earth-contacting portion of the apparatus illustrating the manner in which horizontally polarized (SH) waves and compression (P) waves are generated.

FIG. 8 is an enlarged partial cross-section illustrating the beginning of a seismic energy generating compressed air discharge being focused upwardly toward the reaction mass by the conical bottom of the cylinder;

FIGS. 9–11 are elevational views illustrating the operating sequence.

FIG. 17 is a detail of the inclining system employed with the seismic source of the invention.

FIG. 18 is an enlarged cross section taken substantially along the line 18—18 of FIG. 16, showing details of a lift cylinder and piston and shock absorber and associated apparatus.

FIGS. 19–21 illustrate various means for insuring intimate contact and engagement between the seismic source ground plate and the earth or a road bed, in some cases.

DESCRIPTION OF THE PREFERRED EMBODIMENTS

Embodiment A

Figure 1:
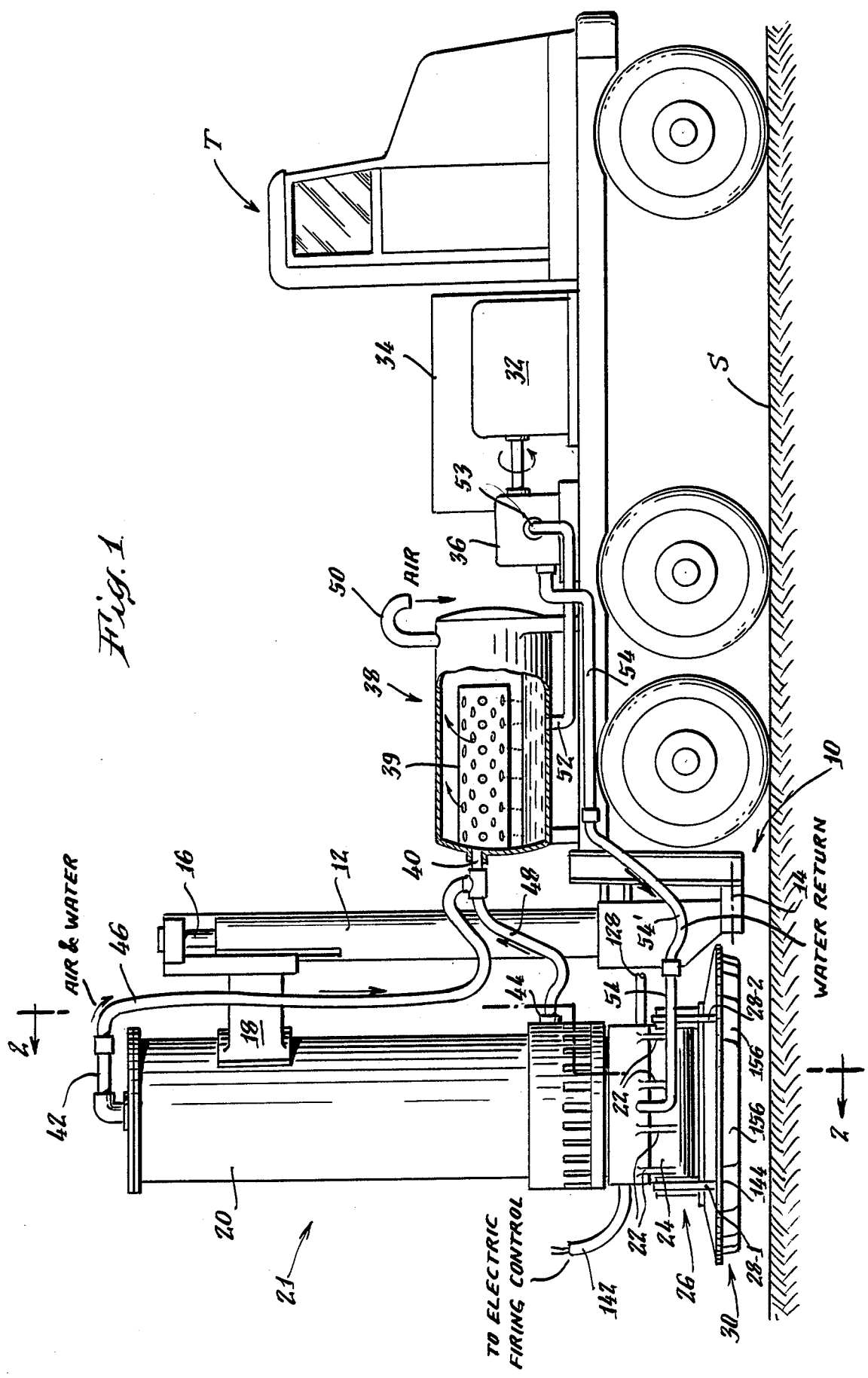
FIG. 1 is an elevational view of a land seismic energy surface source and its transporter embodying the present invention.

In FIG. 1 there is illustrated apparatus embodying this invention including a transport carrier T which, in this instance, is shown as a flatbed truck for travel along the earth's surface S. Depending from the rear of the truck bed is a hanger assembly 10 which carries the lower end of a vertically extending hydraulic lift 12 which is rotatable about a pivot axis 14. Any suitable means may be employed for inclining the hydraulic lift 12 to the left and to the right relative to the hanger assembly 10 at a selected angle including, for example, an arcuate sector gear and pinion (not shown). The hydraulic lift 12 includes a vertically movable piston and its rod 16 which carries a bracket 18 which supports the elongated cylinder 20 of the seismic energy generator 21. This cylinder 20 has a strong circular cylindrical wall 19 with the lower portion of this wall 19 being thicker as seen at 23 (FIG. 3) for providing additional strength. A plurality of substantially triangularly shaped gussets 22 (see also FIG. 2) extends downwardly from the lower end of the cylinder 20 and support the substantially cylindrical housing 24 of a horizontal pivot shaft bearing assembly 26. Pivotally suspended from the opposite ends of this bearing assembly 26, by means of spaced, parallel brackets 28-1 and 28-2, is a ground-contacting plate assembly 30 which will be described in detail below.

Mounted upon the bed of the transporter T are a prime mover such as diesel engine 32, an air compressor 34 for delivering high pressure air, for example in the range from 1,000 to 5,000 pounds per square inch (p.s.i.), a positive displacement water pump 36, and air/water separator 38 having an internal perforated drum 39. The water pump 36 and the compressor 34 are driven by the prime mover 32. The inlet 40 of the separator 38 is connected to the upper and lower ends of the cylinder 20 by means of suitable fittings 42, 44 and flexible hoses 46, 48. Air from the separator 38 exits into the atmosphere via vent 50, and water pooled in the bottom of the separator 38 passes through discharge line 52 to the intake 53 of the pump 36, and by this pump the water is returned to the bottom of the cylinder 20 via supply lines 54, including a flexible hose portion 54'.

Figure 2:
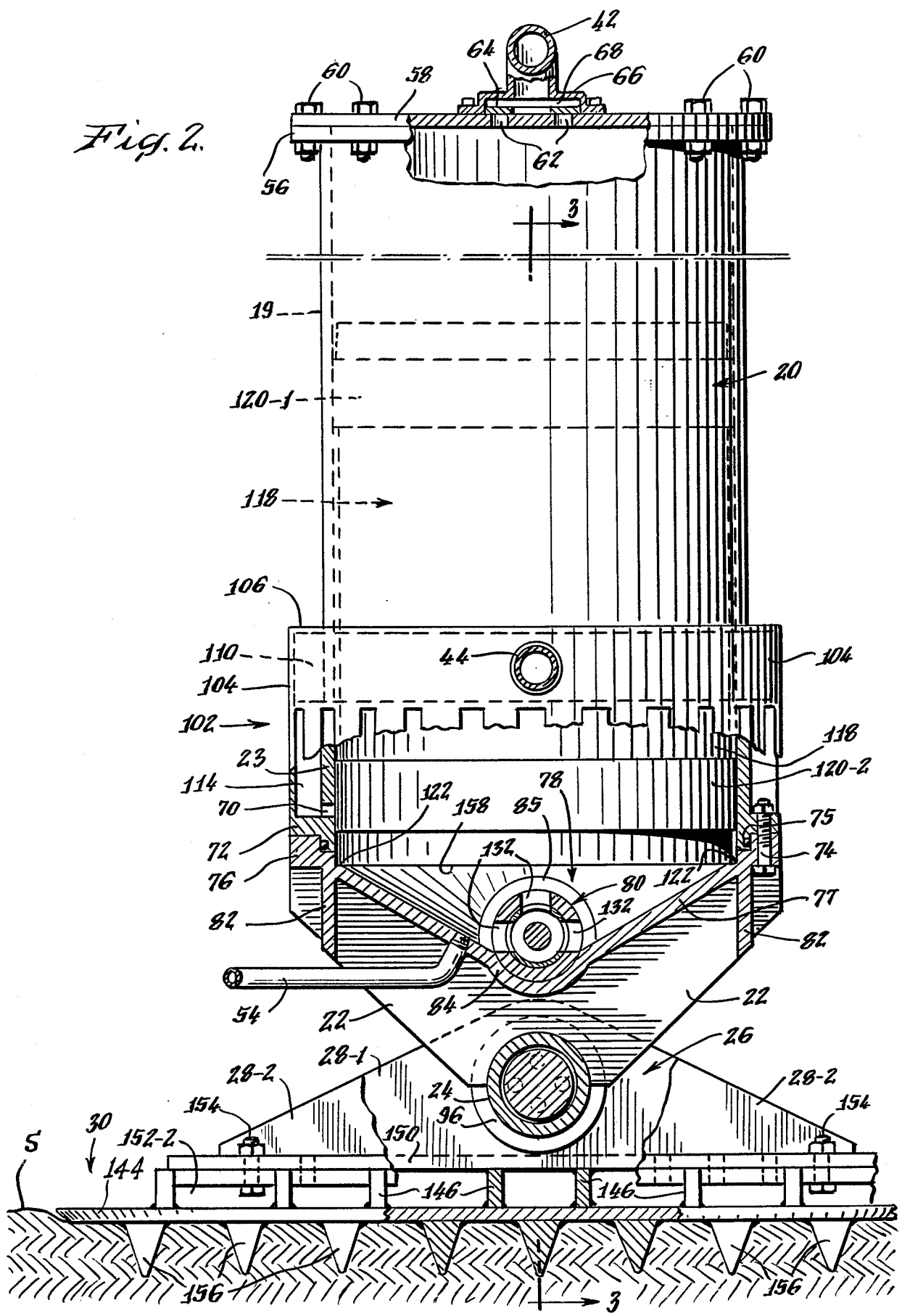
FIG. 2 is an enlarged vertical section taken substantially along the broken line 2—2 of FIG. 1, looking toward the left (rear) of this land seismic source.
Figure 3:
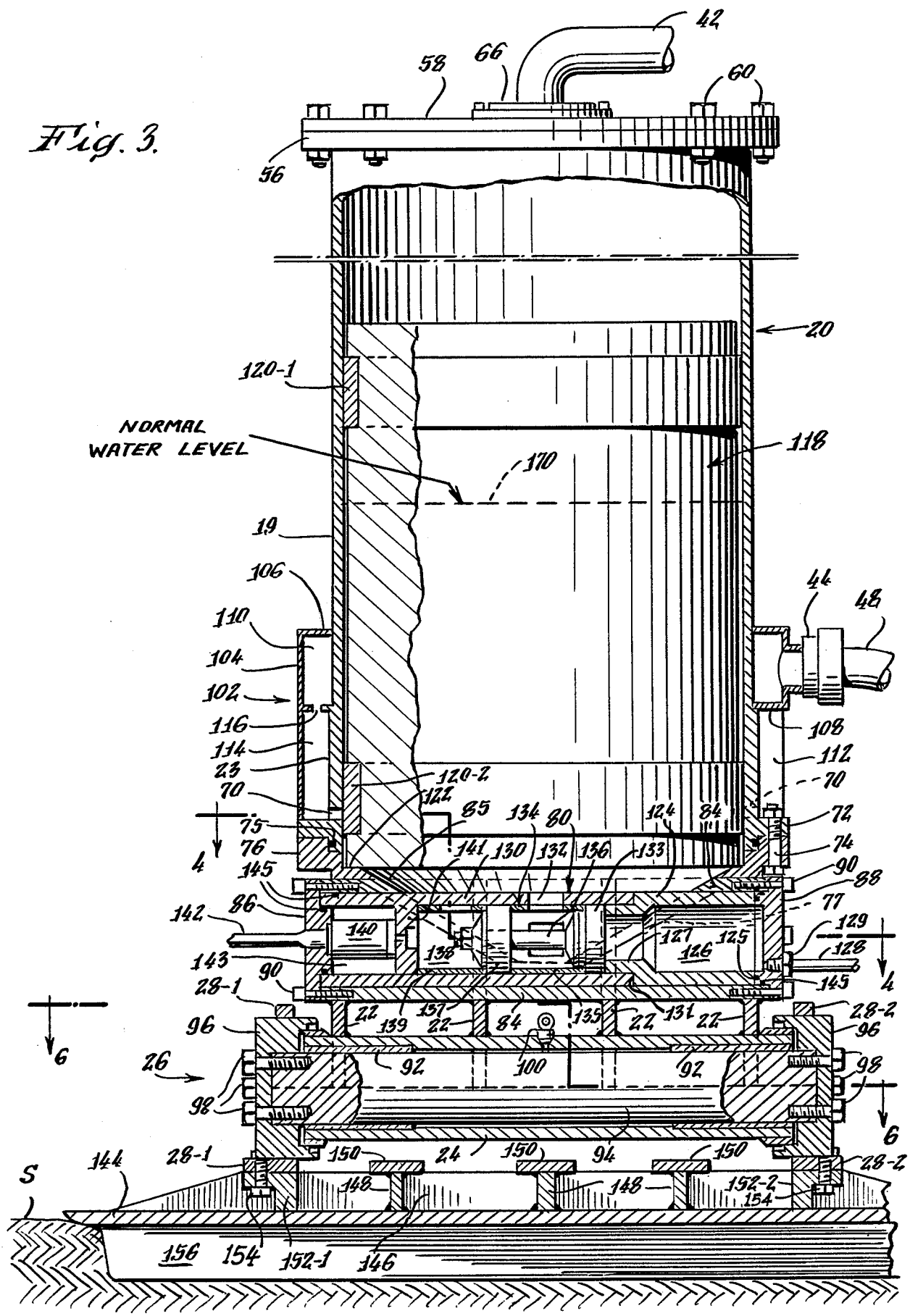
FIG. 3 is a vertical section taken substantially along the line 3—3 of FIG. 2, looking toward the right in FIG. 2.

Turning now to FIGS. 2 and 3, the cylinder 20 will be seen to have an upper end encircled by a flange 56 to which is secured a cover plate 58 by means of bolts 60. As will be seen in FIG. 2, the center of this cover plate 58 includes a circle of discharge holes 62. Lying down against and normally closing those holes 62 is a washer-like ring 64 having a central opening and loosely retained within a circular housing 66 which carries the outlet 42. Sufficient head space 68 is provided between the ring 64 and the housing 66 to permit this ring to rise and fall and thereby function as a check valve, which is normally resting down on the cover plate as a result of its own weight.

The thickened lower wall portion 23 of the cylinder 20 is perforated by a ring of radial holes 70 uniformly circumferentially spaced and located adjacent to the upper surface of an outwardly extending flange 72. Secured to this flange 72 by a ring of bolts 74, and sealed by an O-ring 75, is the circular flange 76 of a substantially conical portion 77 of an upside-down cylinder head 78. This upwardly-diverging conical portion 77 of the cylinder head 78 defines, near its apex, a pair of aligned openings for receiving horizontally therethrough a cylindrical air gun assembly 80. Thus, the cylinder head 78, as a whole, is defined by a conical portion 77 and a horizontally extending circular cylindrical air gun assembly which intersects the conical portion 77 at right angles to the axis of the cone near the apex of the cone.

Figure 4:
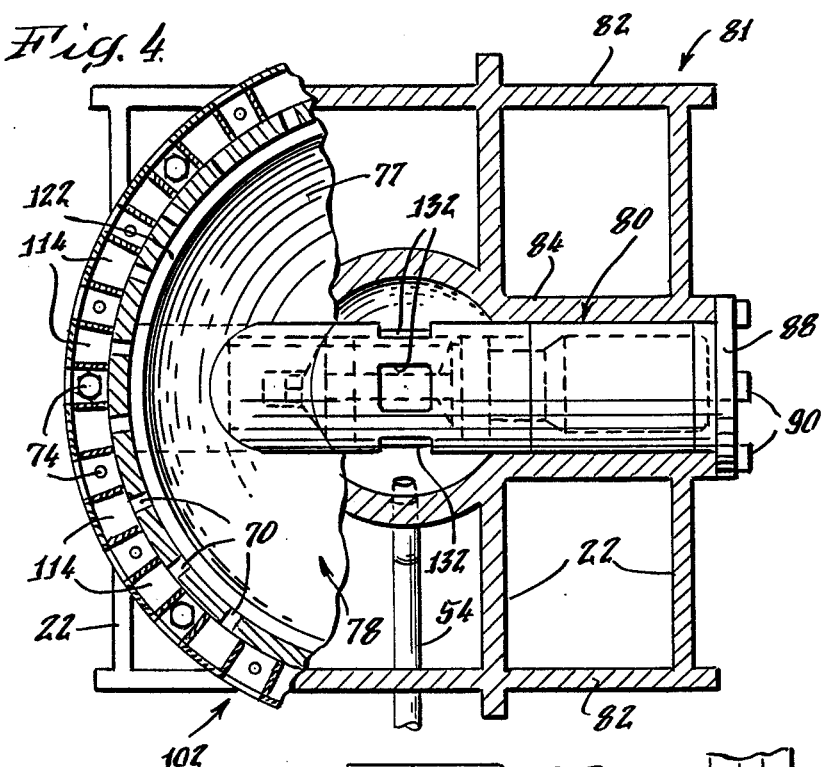
FIG. 4 is a cross-section taken substantially along the broken line 4—4 of FIG. 3, looking downwardly.

As can be seen from FIG. 4, there is bracing structure 81 surrounding the cylinder head 78 and this bracing is essentially rectangular as seen in horizontal cross-section and includes, in addition to the gussets 22, stiffening side member 82 and a central elongated horizontal cylindrical casing 84 containing the air gun assembly 80. The air gun assembly 80 is held within the cylindrical casing 84 by a pair of removable end caps 86, 88 secured by bolts 90. The components of this air gun assembly can be removed from the cylindrical casing 84 after removal of these end caps 86, 88.

As shown in FIGS. 2 and 3, the horizontally extending, circular, cylindrical casing 84 for the air gun assembly 80 is cut away at 85 flush with the inner surface of the conical portion 77 of the cylinder head 78. Certain components of the air gun assembly including its three discharge ports, to be described later, are exposed to the lower end of the cylinder 20 through the cut-away region 85 of the cylindrical casing 84.

As previously explained, the lower ends of the triangular gussets 22 (FIG. 2) are welded to and support the cylindrical bearing housing 24. As will be seen in FIG. 3, this bearing housing 24 includes a bearing sleeve 92 at each end and encloses a strong, solid steel rotatable pivot shaft 94. A shaft retainer 96 is removably connected to each end of the shaft 94 by bolts 98. Suspended from these retainers 96 are the spaced brackets 28-1, 28-2, which support the plate assembly 30. A grease fitting 100 centrally mounted on the bearing housing 24 permits lubrication of the pair of spaced sleeve bearings 92.

Reference has previously been made to the uniformly circumferentially spaced holes 70 in the lower cylindrical wall portion 23 so that these holes 70 encircle the lower end of the cylinder 20. Referring specifically to FIGS. 2, 3, and 4, it will be noted that the flange 72, which is adjacent to these holes, forms the base of an annular manifold assembly 102. This manifold assembly 102 includes a cylindrical outer wall 104 radially spaced outwardly from the wall 23, 19 of the cylinder 20 to form an annular space bounded by an upper annular radial wall 106. An annular horizontal wall 108 divides the space so formed and defines the bottom of a ring-shaped manifold chamber 110 to which is secured the connection fitting 44 for the hose 48 leading to the separator 38.

Figure 5:
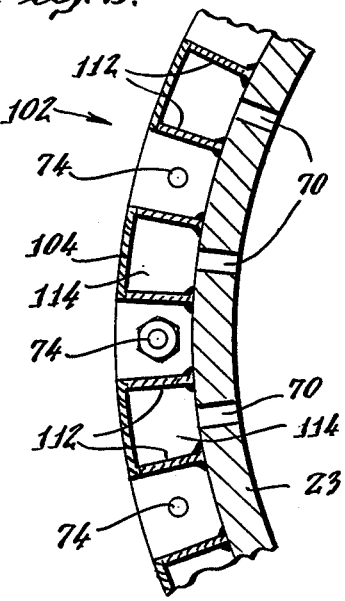
FIG. 5 is an enlarged detail view of a portion of the apparatus illustrated in FIG. 4.

The space between the horizontal wall 108 and the flange 72 is further divided by a plurality of vertically extending radial side walls 112. Please see also FIG. 5. The numerous spaces so defined between successive pairs of the radial walls 112 form vertical passages 114 which connect at their lower ends with the holes 70. At the upper ends of these passages 114 the horizontal wall 108 is provided with apertures 116 providing access to the manifold chamber 110. The portions of outer wall 104 intermediate the passages 114 are cut away to form niches permitting access to the bolts 74.

Contained within the cylinder 20 is a heavy cylindrical piston-like reaction mass 118. This reaction mass 118 is slidable within the cylinder 20 by virtue of upper 120-1 and lower 120-2 bearing sleeves carried by the cylindrical mass. These bearing sleeves 120-1 and 120-2 are mounted in grooves near opposite ends of the reaction mass 118, and they slide freely against the inside surface of the walls 23, 19 of the cylinder 20. When in the "rest" position, as illustrated in FIGS. 2 and 3, this reaction mass 118 rests upon an annular shoulder 122 (FIG. 2) formed in cylinder head 78 at the perimeter of the conical portion 77.

As previously explained, a cylindrical air gun assembly 80 intersects the apex end of the conical portion 77 of the cylinder head 78. Specifics as to the principles of operation of an air gun may be found in the disclosures of U.S. Pat. Nos. 3,379,273; 3,653,460; 3,808,822; 3,997,021 and 4,271,924. This air gun assembly includes a substantially cylindrical three-chamber housing assembled within the outer cylindrical casing 84, including a first end housing 124 which defines a firing chamber 126. This firing-chamber housing 124 has a sliding fit within the forward end (right end in FIG. 2) of the cylindrical casing 84 and can be removed from this casing by first removing the forward end cap 88. An O-ring 125 seals the firing chamber 126 at the mating surfaces of the end cap 88 and the end of the firing-chamber housing 124. The firing chamber 126 is supplied with high pressure air through a high-pressure supply line 128 from the air compressor 34 on the truck T. A fitting 129 in the end cap 88 connects the air supply line 128 to the firing chamber 126. An air gun housing 130 defines discharge ports 132 and includes a central chamber 134 surrounding a shuttle 136 and an operating chamber 138 communicating with a solenoid valve 140 controlled, in turn, by an electric firing cable 142. It will be noted that the firing-chamber housing 124 and the housing 130 are held together in the casing 84 by the end caps 86, 88. This construction also makes it possible to remove and change either the firing-chamber housing 124 or the gun housing 130 without removing both of them.

The firing-chamber housing 124 is necked down at its inner end at 127 for providing an annular socket 131 for receiving the inner end of the air gun housing 130 of the air gun assembly 80. The annular firing seal assembly 133 of the air gun may be similar to that shown in U.S. Pat. No. 3,997,021, and it abuts against and is axially located in position within the gun housing 130 by the necked-down inner end 127. A cylindrical sleeve 135 abuts against the firing seal assembly 133 and holds it in place. This sleeve 135 has discharge ports aligned with the discharge ports 132 in the gun housing 130. The shank of the shuttle 136 has a sliding fit through a partition 137 which abuts against and is axially located in position within the housing 130 by the sleeve 135. This partition 137 separates the operating chamber 138 from the central chamber 134.

Another cylindrical sleeve 139 lines the operating chamber 138 and abuts against the partition 137 for holding it in place captured between the two sleeves 139 and 135. This operating-cylinder sleeve 139 abuts at its other end against a transverse wall 141 fixed within the gun housing 130. This wall 141 forms the end of the operating chamber 138, and the solenoid valve 140 is mounted on this wall 141. By virtue of the fact that this wall 141 is spaced inwardly from the end cap 86 there is a protected space 143 for the solenoid valve 140. This solenoid valve is held in position in its space 143 by being captured between the fixed wall 141 and the removable end cap 86. There are appropriately located O-ring seals as will be understood for example as shown at 145 for sealing the air gun chamber and for sealing firing-trigger passages associated with the solenoid valve 140. There is a firing-trigger passage drilled in the transverse wall 141 for leading from the operating chamber 138 to the solenoid valve 140. In order to provide a firing-trigger passage leading from the solenoid valve to the underside of the operating piston of the shuttle 136 there is a drilled passage in the transverse wall 141 communicating with a longitudinally drilled passage in the wall of the gun housing 130 communicating with a drilled passage in the partition 137 communicating with the underside of the operating piston of the shuttle. This operating piston is in the operating chamber 138 and its underside closely faces the partition 137 when the shuttle is in its initial position prior to firing as shown in FIG. 3. The firing piston of the shuttle seats against the annular firing seal 133 when the shuttle is in its initial position. An axial passage extends through the shank of the shuttle 136 for supplying high pressure air from the firing chamber 126 to the operating chamber 138.

Figure 6:
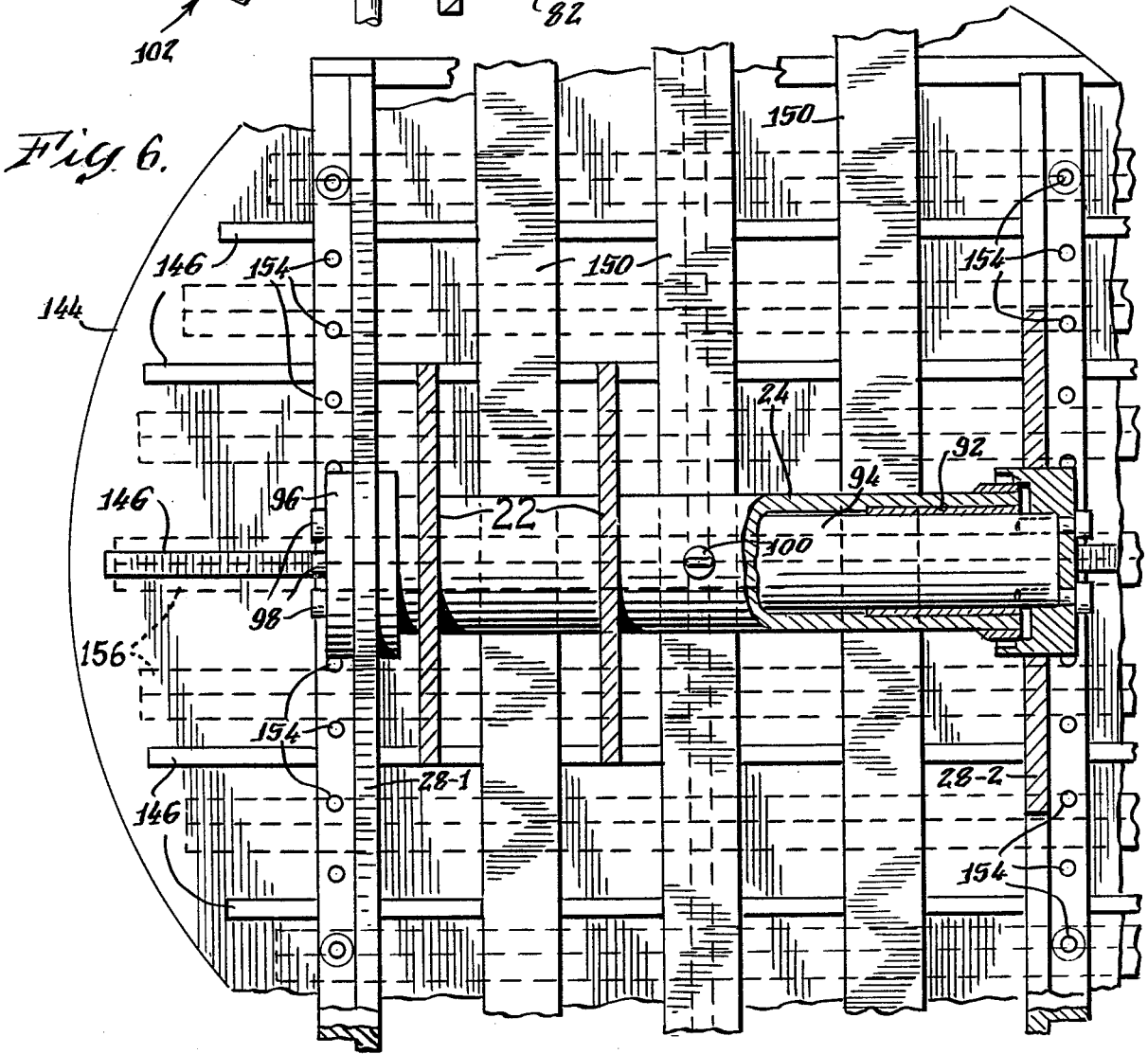
FIG. 6 is a cross-section taken substantially along the broken line 6—6 of FIG. 3, looking downwardly.

The construction of the plate assembly 30 previously mentioned may be best understood by reference to FIGS. 2, 3 and 6. In view of its function of transferring powerful seismic shocks into the earth, this ground-contact plate assembly 30 must be quite strong and rigid. It comprises a steel disk 144 strengthened on top by a plurality of parallel stiffening ribs 146 (FIG. 2) welded to it. Transverse ribs 148 interconnect and brace these stiffening ribs 146, and tie bars 150 extend along the upper edges of transverse ribs 148 as will be clear, for example, from FIG. 3. The transverse ribs 148 plus the tie bars 150 define a T-section as seen in FIG. 3. Extending along opposed chords of the disk 144, and parallel with the transverse ribs 148, are a spaced pair of angle irons 152-1, 152-2 welded to the top of the disk 144. These angle irons are bolted respectively by bolts 154 to flanges of the respective brackets 28-1, 28-2. Completing the plate assembly 30 are a plurality of uniformly spaced blades 156 welded to the lower surface of disk 144 parallel to the axis of the pivot shaft 94. These blades 156 have a narrow triangular configuration for biting into and gripping the earth for transferring horizontally polarized shear stress into the earth as will be described.

Operation

In order to generate seismic waves in the earth the solenoid valve 140 of the air gun assembly 80 is energized, causing the air gun to suddenly discharge high pressure air with explosive-like abruptness through the discharge ports 132 into the surrounding water 160 as seen in FIG. 8. The conical portion 77 of the cylinder head 78 focuses the blast upwardly toward the lower end surface 158 of the reaction mass 118 producing a powerful downward explosive-like shock 162 aligned with the centerline of the cylinder 20. When this cylinder is inclined by swinging it to the right or left about the pivot shaft 94 of the bearing assembly 26, then the powerful downward shock 162 is inclined as seen in FIG. 8. This powerful downward shock 162 is transferred from the cylinder head 78 through the rigid pivot shaft 94 into the ground-contacting plate assembly. The vertical component P of the sudden downward shock 162 generates compressional (P) waves 164 transmitted down into the earth. The horizontal component of this sudden downward shock 162 generates horizontally polarized shear (SH) waves 166 transmitted down into the earth as shown by the dotted arrow 168, and which propagate themselves more slowly than P waves.

With particular reference to FIG. 1, the seismic energy generator apparatus 21 embodying the invention is shown suspended from the flatbed of a truck T and above the surface S of the earth. In this position, the apparatus can be moved as required to the desired position on the earth's surface. When that position has been reached, the hydraulic lift 12 is activated to lower the piston and rod 16 and thereby to lower the attached seismic wave generator 21 so as to cause the plate assembly 30 to bear against the surface S of the earth with the teeth-like blades 156 penetrating the surface. The amount of penetration will, of course, depend upon the nature of the surface, the downward force applied, and the weight of the apparatus. At maximum penetration, the disk 144 will rest directly upon the surface of the earth.

When the assembly is lowered, the axis of rotation of the bearing assembly 26 will be substantially aligned with the pivot axis 14 defined by the hanger assembly 10. The entire mechanism, including the hydraulic lift 12 and the cylinder 20, may then be tilted about the axis of pivot 14 and the pivot shaft 94 of the bearing assembly 26. The housing 24 rotates about the bearing shaft 94. Thus, the plate assembly 30 and the brackets 28-1, 28-2 remain fixed relative to the earth's surface S, but the cylinder 20 is tilted as shown in FIGS. 7–11 to any desired angle of inclination up to a maximum limit of approximately 50° away from vertical, at which limit the gussets 22 (FIG. 3) on the down side abut against the ground plate 30.

Prior to the firing of the air gun assembly 80, the space between the bottom 158 of the reaction mass 118 and the cylinder head 78 is filled with an incompressible liquid 160 which, in most practical embodiments, will be water. In the illustrated embodiment, water is supplied by the positive displacement pump 36 through lines 54, 54'. It fills the volume below the reaction mass and, under pressure, bypasses the bearing sleeve 120-2 of the reaction mass 118 to fill passages 114 and manifold chamber 110, returning to the pump 36 via flexible hose 48, air/water separator 38, and discharge line 52. The pressure head of the pump 36 is such as to maintain a normal water level below the top of the reaction mass 118, substantially as shown at 170 in FIG. 3. Meanwhile high pressure air from the air compressor 34 is fed into the firing chamber 126 (FIG. 3) of the air gun assembly 80 from supply line 128. This air passes through the hollow center shaft of shuttle 136 and into the operating chamber 138 in the same fashion as disclosed in the patents referred to above. Thus, the entire air gun assembly 80, including the firing chamber 126 and the operating chamber 138, is pressurized to the desired pressure of the compressed air being supplied by the compressor 34.

In order to fire the air gun, an electrical firing pulse is transmitted via firing cable 142 to the solenoid valve assembly 140. The solenoid valve assembly operates in known fashion to unseat the operating piston of the shuttle 136 from the partition 137. As disclosed in the referenced prior art patents, this unleashes the energy stored in the firing chamber 126 by the compressed air, throwing the shuttle into its open position and permitting the highly compressed air to blast suddenly out through the discharge ports 132. As illustrated in FIG. 8, the exiting air blast exerts a strong force against the incompressible water 160, thereby exerting sudden equal and opposite forces against the reaction mass 118 and the plate assembly 30 (transmitted through the shaft 94 of the bearing assembly 26). Since the blades 156 have been previously buried in the surface of the earth, they are relatively immovable relative thereto and thus create not only a strong downward force resulting in compression (P) waves 164 but also a strong component parallel to the earth's surface creating horizontally polarized shear (SH) waves 166.

Concurrently with the production of the desired force into the earth, the reaction mass 118 is driven upwardly as illustrated in FIGS. 9 and 10. As mass 118 begins its upward travel, it uncovers the holes 70 in the cylinder 20 (FIGS. 2 and 3). This permits the water 160 and expanded air to exit via passages 114 and into manifold chamber 110 and thence through hose 48 into air/water separator 38. Desirably, the holes 70 are positioned near the lower bearing sleeve 120-2 to avoid elevating the reaction mass 118 needlessly. These holes 70 are sufficiently elevated to allow sufficient time for the rise time (approximately 5 milliseconds) of the resultant land source seismic pulse. Any air and water arising within the cylinder 20 above the reaction mass 118 are forced outwardly through the holes 62 in the cover plate 58 and through the check valve formed by ring 64 and housing 66. This air and water exit through the fitting 42 and hose 46 leading to the air/water separator 38. The perforated drum 39 reduces the air velocity to permit entrained water to separate from the air and drop into the bottom of the separator 38 where it pools and is returned via discharge line 52 to the pump 36. The air is discharged to atmosphere through the vent 50. The reaction mass 118 thereupon returns by gravity to its initial position, and the cycle is ready to be repeated. The check valve 64, 62 closes as soon as the reaction mass 118 starts to slide downwardly in the cylinder, and thus a reduced pressure (suction) is created in the upper end of the cylinder for advantageously slowing the descent of the reaction mass as seen in FIG. 11.

As shown in FIGS. 7 through 11, the present invention enables the seismic energy generator 21 to be stood upright at a shot point on the earth's surface, and the air gun assembly 80 is fired as many times as desired for generating P waves. The first upright firing will serve to embed the teeth 156 fully into the earth. Then the cylinder 20 is inclined to the left of vertical, and the air gun 80 is fired as many times as desired for generating P waves plus left-handed SH waves. Then the cylinder 20 is inclined to the right of vertical, and the air gun is fired as many times as desired for generating P waves plus right-handed SH waves. After completing the desired firing sequence, the transporter T moves to the next shot point along a desired survey line, and the firing sequence is repeated.

Embodiment B

A modified embodiment of the invention previously described is illustrated in FIGS. 12–18. In this modification, the seismic energy generator 21 is essentially the same in construction and operation as previously described. Accordingly, it is identified by the same reference numeral as in the first embodiment A and the same reference numerals are used for corresponding parts. The basic differences between embodiments A and B reside in the latter's transporter and in the system and apparatus for its suspension, manipulation and operation from the transporter vehicle T'.

Figure 12:
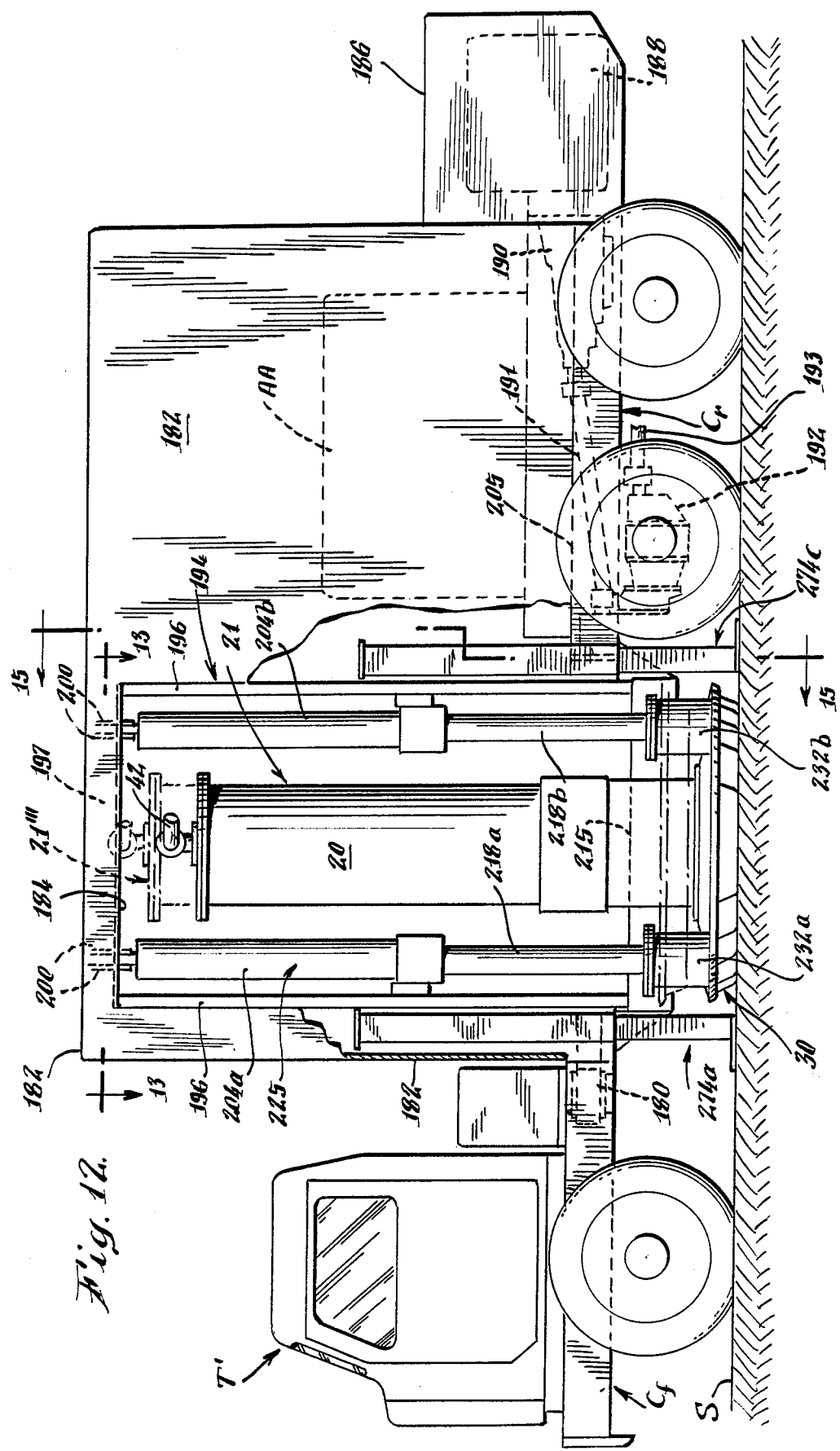
FIG. 12 is an elevational view of a modified version of a land seismic energy source and its transporter embodying the present invention.

Referring to FIG. 12, the transporter T' of this second embodiment B has a two-part chassis, a forward part $C_f$ which carries the cab, and a rearward chassis $C_r$ which carries the seismic energy generator 21, a compressor for supplying high pressure compressed air, other auxiliary equipment, and the engine and transmission. These two portions of the chassis $C_f$ and $C_r$ are interconnected by a swivel joint 180 which permits these two portions of the chassis to tilt laterally relative to one another about a horizontal, longitudinal axis. Mounted on rear chassis $C_r$ is a weatherproof enclosure 182 of conventional rectangular cross section and defining a pair of aligned rectangular side openings 184, which are open toward opposite sides of the vehicle. An engine hood 186 mounted at the back of the rear chassis $C_r$ encloses a diesel, truck-type of engine 188 which powers the four rear wheels through a transmission 190, a drive shaft 191, and differentials 192 for each pair of rear wheels. Only one differential 192 is shown, being connected by a drive shaft 193 with the other one.

The auxiliary apparatus required by the seismic energy generator 21, as previously described for embodiment A, is mounted within the enclosure 182 and includes inter alia such equipment as an air compressor 34, a water pump 36 (FIG. 1), and an air/water separator 38 (FIG. 1). They are indicated generally as auxiliary apparatus AA.

The seismic energy generator 21 is supported within the enclosure 182 within an open-sided compartment 225 by a load-bearing framework 194 (FIGS. 12, 13, 15 and 16), which includes columns 196 (FIGS. 15 and 16) and beams 197 and 198. Suspended from the top of the framework 194, by means of tongues 199, pairs of spaced parallel hanger plates 200, and pins 202 (FIG. 16), are a pair of hydraulic lift cylinders 204a, 204b, located forward and rearward, respectively, of the seismic energy generator 21. Mounted near the lower end of each of these hydraulic lift cylinders 204a, 204b is a collar 206a and b, respectively, which is adjacent a corresponding forward and rear crossbeam 208 (FIG. 15) of the framework 194.

Figure 13:
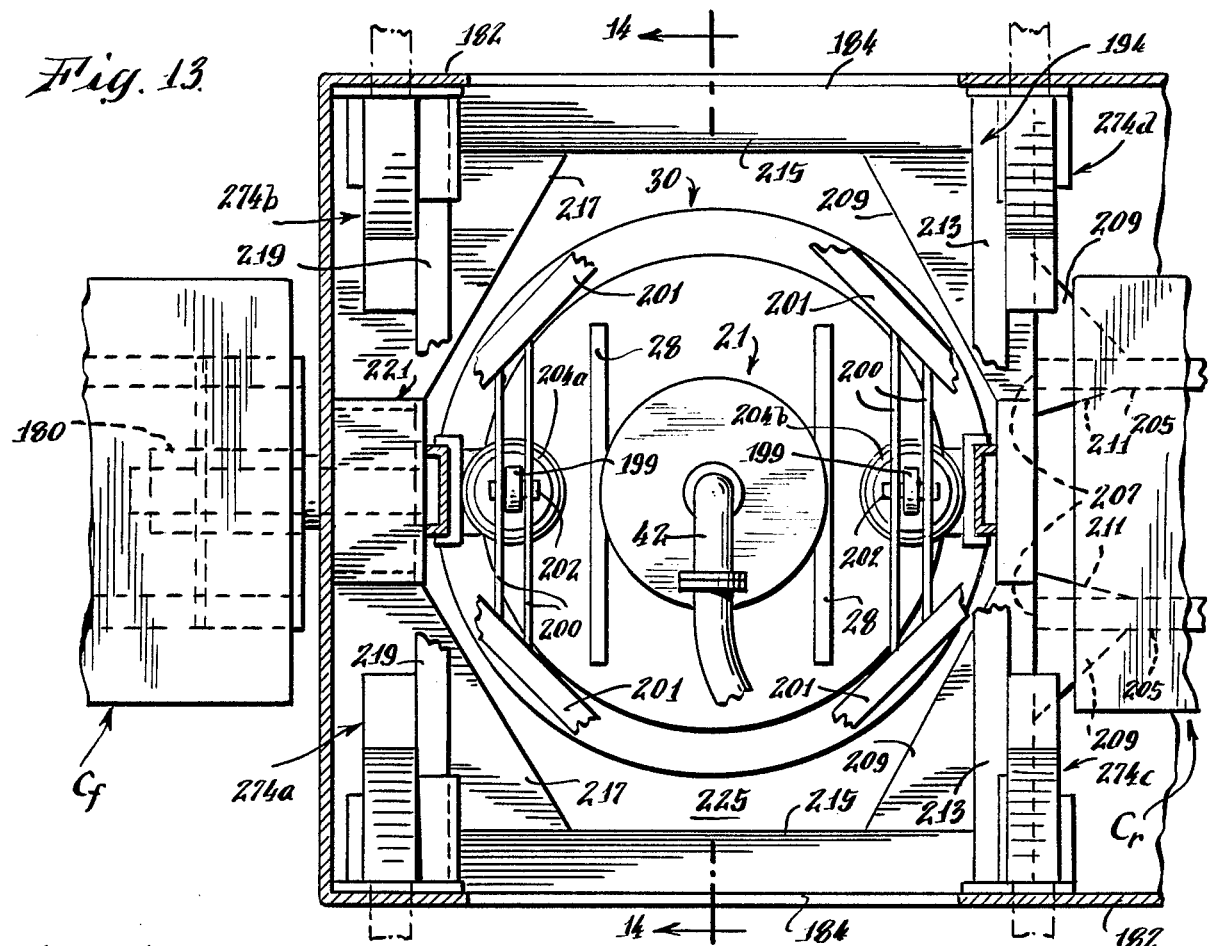
FIG. 13 is an enlarged plan-sectional view taken substantially along the line 13—13 of FIG. 12, looking down.

The four columns 196 extend vertically along the forward and rear margins of the two side openings 184. The horizontal beams 197 and 198 form a rectangular top frame 195 interconnecting the upper ends of the four columns 196. The two beams 198 extend transversely of the vehicle, and the other two beams 197 extend fore and aft. Within the rectangular top frame 195, formed by the two pairs of horizontal beams 197 and 198, there is an inner diamond-like frame formed by four more horizontal beams 201 which extend diagonally across the respective corners of the rectangular top frame. These diagonal beams 201 brace the top frame 195. The two pairs of hanger plates 200 for supporting the front and rear lift cylinders 204a and 204b are located, as seen in FIG. 13, at the respective forward and rear corners of the inner diamond-like frame, namely, where the diagonal beams 201 are converging toward a junction with the respective forward and rear transverse top beams 198. As indicated at the left in FIG. 15, the side panels of the enclosure 182 are stiffened by vertical interior posts, such as shown partially at 203.

Figure 14:
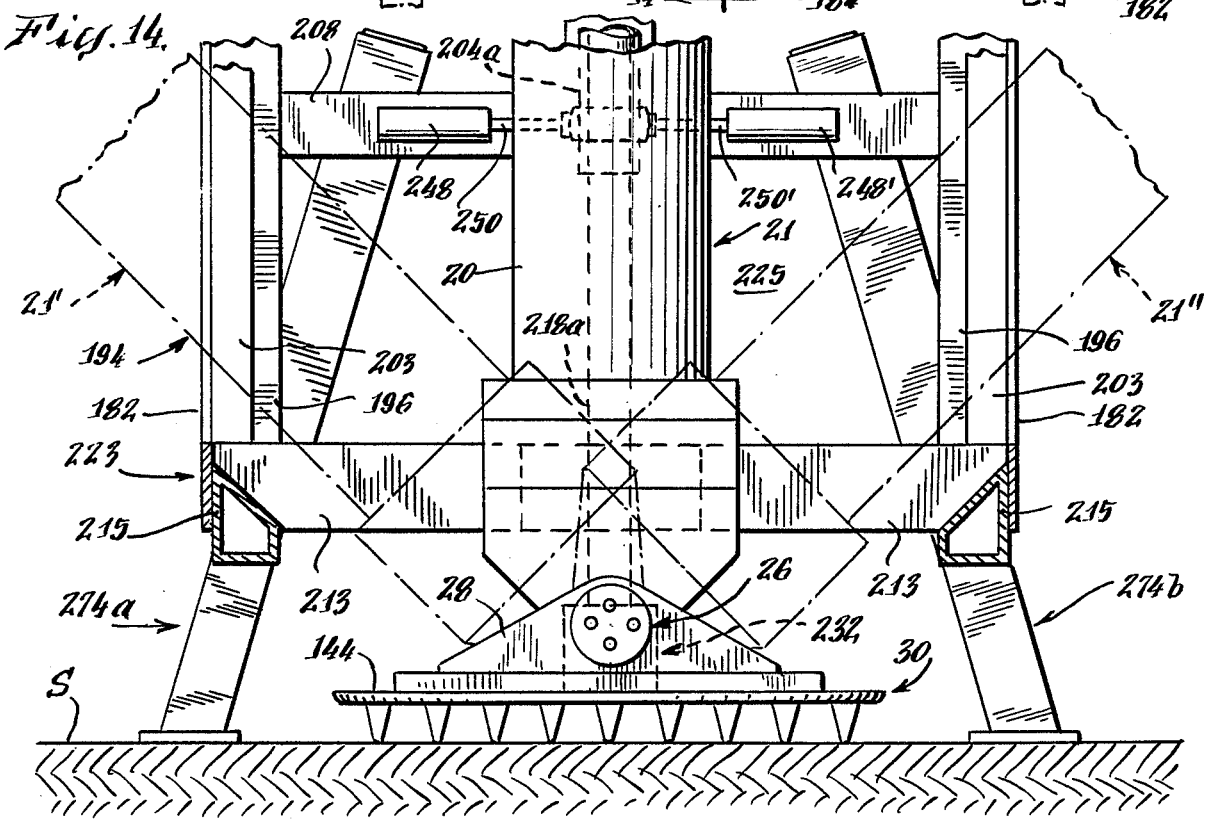
FIG. 14 is a cross section taken substantially along the line 14—14 of FIG. 13, looking to the left, i.e. toward the front of the transport vehicle, and showing the earth-contacting and lower portions of the seismic source.

The two main longitudinal frame members 205 (FIG. 13) of the rear chassis portion $C_r$ are spaced laterally approximately thirty-four inches apart. In order to accommodate the mounting of the seismic energy generator 21 within the interior of the transporter T', these main frame members 205 are terminated at 207 and are welded to triangular gussets 209 and 211 which, in turn, are welded to a main transverse frame member 213 (see also FIGS. 14 and 15), which extends across the full width of the vehicle T'. This transverse frame member 213 is located at a somewhat lower elevation than the longitudinal frame members 205. The ends of this latter main frame member 213 (FIG. 14) are joined to a pair of fore and aft main frame members 215 extending along opposite sides of the vehicle and which are located at a sufficiently low elevation for allowing the full intended inclination (i.e. tilting) of the seismic energy generator 21 to either side, as shown in dashed outline at 21' and 21''. The inner surfaces of these frame members 215 are shown in FIG. 14 being sloped for providing additional clearance for the tilted generator 21. The forward ends of the two widely spaced side frame members 215 are welded to triangular gussets 217 which, in turn, are welded to a main transverse frame member 219 secured to a rear housing 221 of the swivel connection 180.

Figure 15:
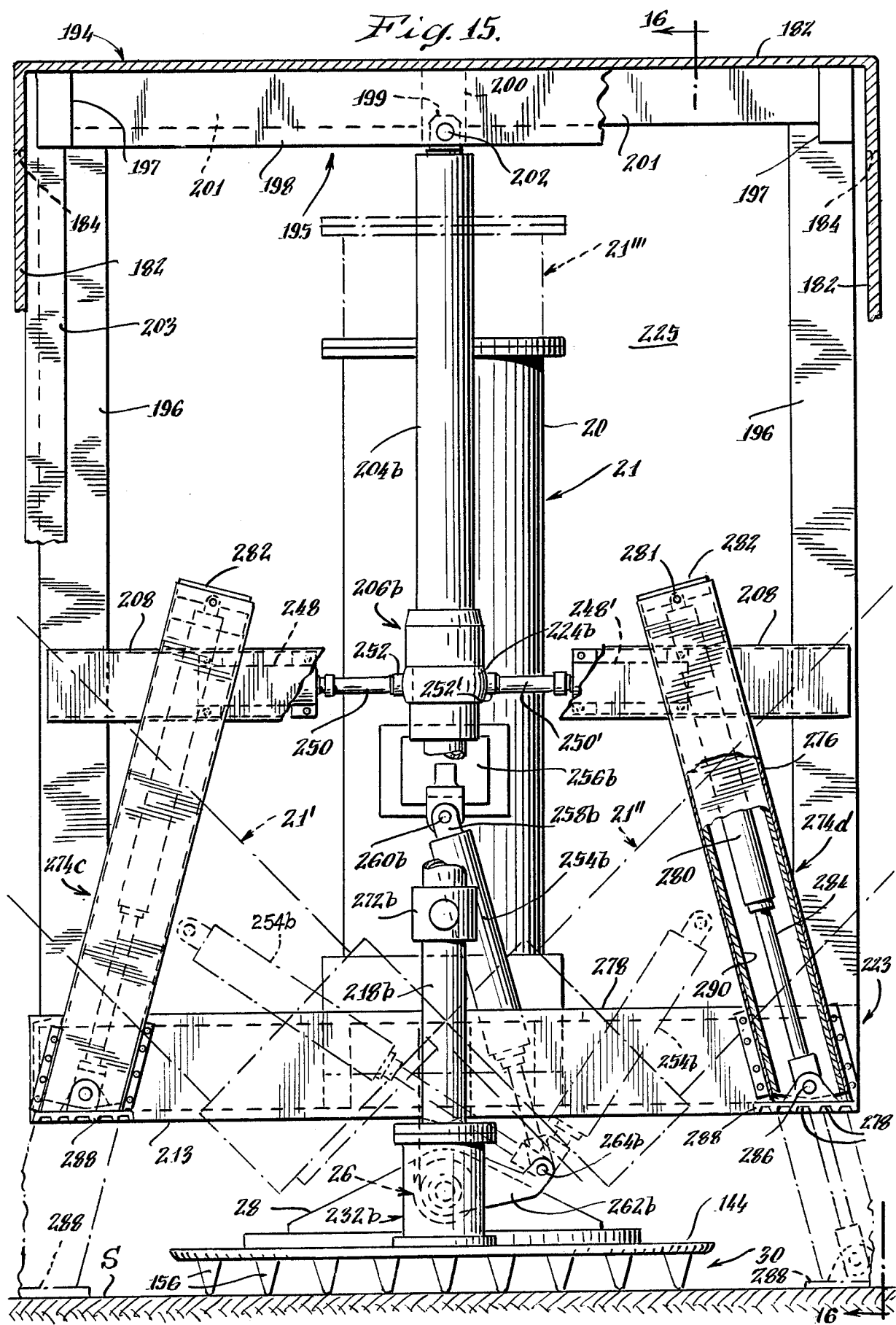
FIG. 15 is an enlarged cross section taken substantially along the line 15—15 of FIG. 12, looking toward the front of the vehicle.

In effect, the two main transverse frame members 213 and 219, plus the two fore and aft main frame members 215, define a bottom frame 223, of generally rectangular shape, which is located directly beneath the top rectangular frame 195 already described, with these top and bottom frames being interconnected by the four columns 196 as seen in FIG. 15. The cross beams 208 are connected to these columns 196 as seen in FIG. 15. Thus, there is provided a generally box-like framework 194 defining within itself a compartment 225 in which the seismic energy generator 21 is located. This compartment 225 is roofed over by the enclosure 182 and also is covered across front and rear by this enclosure. The compartment 225 is open at both sides where the large side openings 184 are located and also is open toward the bottom within the generally rectangular bottom frame 223 for allowing the source 21 to be lowered into contact with the ground.

Returning to further description of the hydraulic lift cylinders 204a and 204b for the seismic energy generator 21, it is noted that the most detailed showing thereof is seen in FIG. 18. The construction of the collar 206 located near the lower end of lift cylinder will be most readily understood from FIG. 18. Such a collar 206 comprises an upper ring 210 which is welded to the cylinder 204. This ring 210 supports, by a plurality of machine screws 212, a bearing housing 214 located at the lower end of the lift cylinder. The inner surface of this housing 214 supports a sleeve bearing 216 which slidably supports a strong, stiff, tubular piston rod 218 of relatively large diameter for resisting bending stresses. A bearing retainer 220 is secured to the bottom of the bearing housing 214 by machine screws 221 and encloses a resilient seal assembly 222 encircling and slidably engaging the piston rod 218 for retaining lubricating oil within the cylinder 204. The outer surface of the bearing housing 214 has an annular saddle recess which retains an external bearing block 224. Opposite facing surfaces of this external bearing block 224 have convex circularly curved profiles, as is clearly shown in FIG. 18.

The upper end of the piston rod 218 includes a piston head cap 226 which retains a piston sleeve bearing 228 and defines a head space 230 at the upper end of the cylinder 204 above the piston head cap 226. The piston 227, as a whole, includes its head cap 226, its sleeve bearing 228 and a pair of resilient seals 229 and 231 located respectively above and below the sleeve bearing 228. The lower seal 231 is retained by a first annular shoulder located on the tubular piston rod 218 somewhat below the lower end of the sleeve bearing 228. The sleeve bearing itself seats down onto a second annular shoulder located on the piston rod. The upper seal 229 seats onto the upper end of the sleeve bearing, and the piston head cap 226 is secured onto the closed top end of the piston rod by machine screws 233.

When the piston 227 is moved up or down within the cylinder 204 by the pressure of hydraulic liquid, the sleeve bearing 228 and its accompanying seals 229 and 231 slide up or down along the inside wall of the cylinder 204. On the other hand, the lower sleeve bearing 216 and its adjacent resilient seal assembly 222 remain stationary, while the tubular piston rod 218 slides up or down through this bearing 216 and its seal assembly 222.

The lower end of the piston rod 218 is coupled to the plate assembly 30 through a shock absorber 232. This shock absorber 232 comprises a cylindrical housing 234 having a bottom flange 236, which is removably mounted to the plate assembly by means of a circle of bolts, as indicated by dashed lines 237. Within and at the bottom of the housing 234 is a stack of three resilient shock-absorbing rings 238 forming a bottom pad. A circular cap 240 is mounted by machine screws 241 onto the lower end of the piston rod 218 and rests against the pad 238. This cap 240 has a diameter greater than that of the piston rod as illustrated in FIG. 18. Mounted above the projecting perimeter of this cap 240 and surrounding the piston rod 218 within the housing 234 is another stack of eight resilient shock-absorbing rings 239 forming an upper buffer pad 242. The buffer pad 242 does not extend to the top of the housing 234. The housing is closed by a top plate 244 bolted onto a top flange 243 of the housing. In this top plate 244 is an opening 246 surrounding, but spaced from, the piston rod 218. In one actual embodiment, the overall height of the shock absorber 232 is 14¼ inches. The vertical thickness of the resilient rings 238 and 239 is approximately one inch each, and the space between the top of buffer pad 242 and top plate 244 is approximately 1½ inches.

It will be understood that the elements just described in connection with the lift cylinder, piston, piston rod, and shock absorber in FIG. 18 are duplicated with respect to the front and rear hydraulic lift cylinders 204a, 204b which are identical, except that they are mirror images of each other. In other Figures where they are visible, as in FIG. 16, they are given the same reference numerals but with the suffixes "a" and "b", respectively, for distinguishing the respective front and rear lift cylinders.

Mounted on the cross beams 208, adjacent to each of the lift cylinders 204a, 204b, as shown in FIGS. 14 and 15, is a pair of small opposed, horizontally oriented, hydraulic clamp cylinders 248, 248'. Horizontal piston rods 250, 250' are shown in FIG. 15 extending toward the collar 206b for engaging the external bearing block 224b by means of opposed clamping heads 252, 252' for serving as restraint for the lift cylinder 204b. These clamping heads 252, 252' are withdrawn away from the external bearing block 224b by retracting the piston rods 250, 250'.

Figure 16:
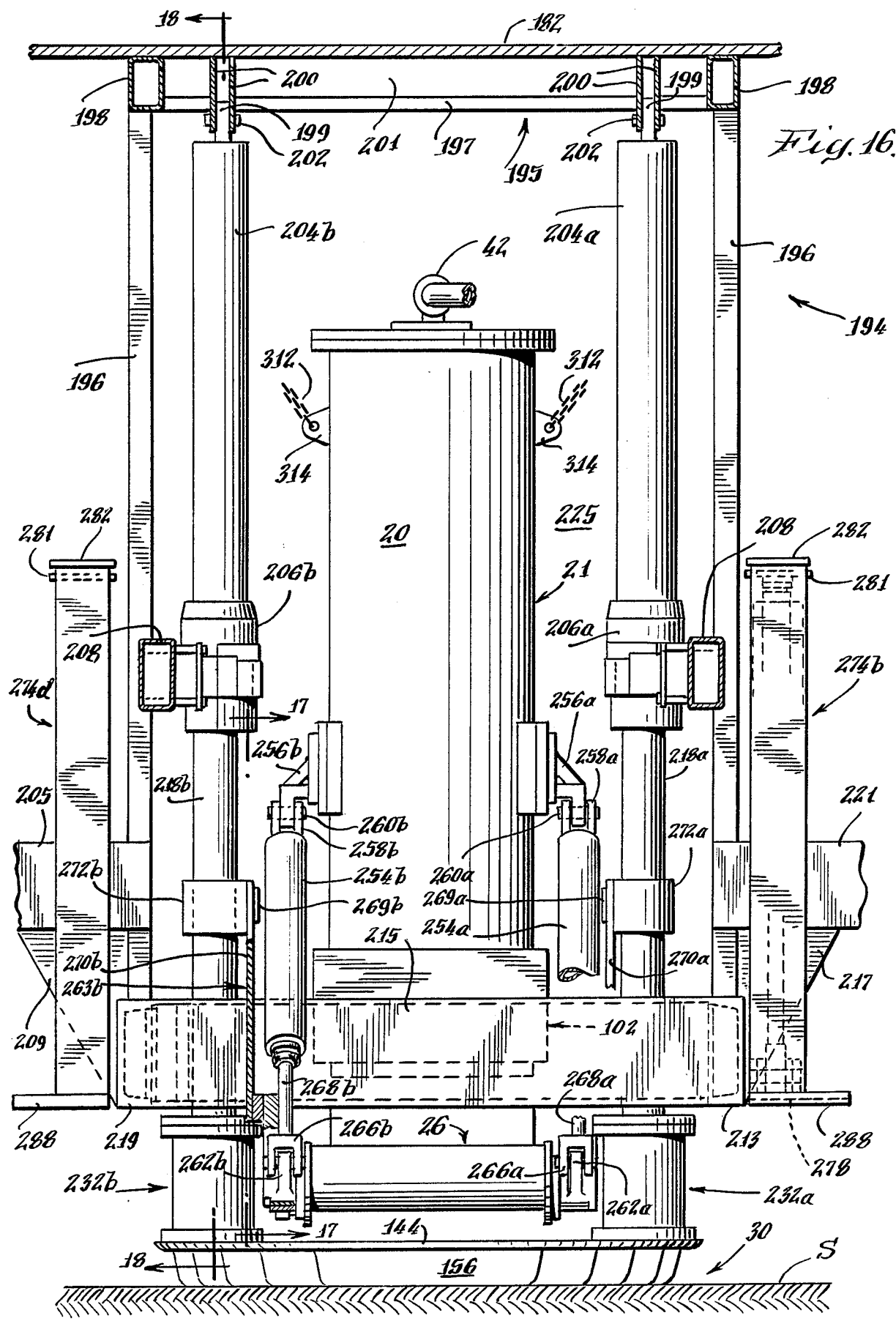
FIG. 16 is a cross section taken substantially along the line 16—16 of FIG. 15.

In the seismic generator modification herein described and illustrated in FIGS. 12-18, tilting (inclination) of the seismic energy generator 21 to produce either left-handed or right-handed horizontally polarized shearwaves is accomplished by a pair of hydraulic tilt cylinders 254a, 254b (FIGS. 15, 16 and 17). The upper ends of the tilt cylinders 254 are pivotally secured to opposite sides of the large cylinder 20 of the seismic energy generator 21 by means of brackets 256a, b, which are welded onto the front end and rear surfaces, respectively, of this large cylinder 20, clevises 258a, b, and pivot pins 260a, b.

It is to be noted that in order to show the tilt cylinders 254a, b and their reaction levers 263a, b more clearly, the section which comprises FIG. 16 is taken looking toward the left in FIG. 15, i.e., looking from the right side of the vehicle. Consequently, FIG. 16 is seen reversed from FIGS. 12 and 13, in which the viewer is looking from the left side of the vehicle. Therefore, in FIG. 16 the forward components with suffix "a" are located at the right of the drawing and the rear components with suffix "b" are located at the left of the drawing.

Connecting the bottom portion of the cylinder 20 of the seismic generator 21 and the ground-contacting plate assembly 30 is a bearing assembly 26 having a horizontal pivot axis extending fore and aft, substantially similar to that bearing assembly 26 described with references to the FIGS. 1-11 embodiment. Accordingly, this bearing assembly 26 is given the same reference numeral. Extending laterally in the same direction from positions adjacent to the forward and rear ends, respectively, of the bearing assembly 26 are forward and rear fixed arms 262a, b. Each of the arms 262 carries a pivot pin 264a, b (see also FIG. 17), which engages a corresponding clevis 266a, b on the end of a piston rod 268a, b, extending from the lower end of the hydraulic tilt cylinder 254a, b. The fixed arm 262 is the short leg of an L-shaped lever member 263a, b which includes an upwardly vertically extending elongated reaction arm 270a, b, which is secured by pin 269a, b to collar 272a, b slidably encircling the hollow piston rods 218a, b. The reaction arms 270 of the levers 263 are offset from their laterally extending arms 262 in order to clear the shock absorbers 232 as is shown most clearly in FIG. 16.

As will be most readily understood from FIG. 17, the elbow portion 265 of the L-shaped lever 263 is connected by a pin 267 to the end of bearing assembly 26 in line with the axis of the bearing assembly 26 for holding the vertical reaction arm 270 always parallel with the piston rod 218 of the lift cylinder. Thus, the pivot pin 264 at the lower end of the tilt cylinder piston rod 268 always maintains a predetermined fixed position relative to the seismic energy generator 21, regardless of whether the generator 21 is raised or lowered by the lift cylinders 204. By virtue of the fact that the collars 272 can slide up or down along their respective tubular piston rods 218, the lift cylinders 204 and the transporter vehicle are isolated from much of the mechanical shock occurring during those moments when the seismic energy generator 21 is fired.

The apparatus of this invention includes four angled stabilizing leg assemblies 274a-d mounted externally of the framework 194. Leg assemblies 274 are positioned at the four lower corners of the framework 194 which surrounds the open-sided compartment 225 containing the seismic energy generator 21. Other than being angled outwardly in opposite directions, these stabilizing leg assemblies are identical and, accordingly, the details of only one (274d) shown in FIG. 15 will be described. This stabilizer leg assembly comprises a hollow, rectangular, outer housing tube 276 which is secured to the main transverse structural frame member 213 of the framework 194. A hydraulic cylinder 280 is mounted within the rectangular housing tube 276 with its upper end connected by a pin 281 to a cover 282 closing the upper end of this tube 276. The piston rod 284 extending from the cylinder 280 is connected at its lower end by pivot pin 286 to a footpad 288. The pivot pin 286 also passes through opposite sides of a rectangular inner tube 290 which is telescoped in sliding relationship within the outer housing 276. The lower surface of the footpad 288 has earth-gripping serrated ridges and grooves 278.

In order to hold the cylinder 20 of the seismic energy generator 21 up in a vertical position when the hydraulic pressure is shut off during long trips or during maintenance, a plurality of restraining chains 312 (FIG. 16) are connected from the overhead frame structure 195 to pad eyes 314 welded onto the cylinder 20. These chains 312 are removed before seismic surveying operations are commenced.

Operation

The operation of the embodiment illustrated in FIGS. 12-18 will now be described. It will be understood that the seismic energy generator 21 functions in the same manner as previously described. The primary distinctions reside in the manner in which the generator is transported, applied to the earth's surface and tilted to produce seismic waves of the desired types in desired sequences and combinations. For over the ground transportation, the leg assemblies 274 are retracted as illustrated in FIG. 15. Similarly, the ground plate assembly 30, along with the remainder of the seismic energy generator 21, is raised into a travelling position by retracting the piston rods 218a, b up into their lift cylinders 204a, b by means of hydraulic liquid introduced into the lift cylinders 204a, b beneath the respective pistons 227.

While in this travelling position, the hydraulic cylinders 248, 248', see, for example, in FIG. 15 are energized to extend their piston extensions 250, 250' so that the clamping heads 252, 252' engage the bearing block 224 upon the lower end of each of the lift cylinders 204a, b. This clamping by the cylinders 248, 248' prevents sway and stabilizes the generator 21 during travel. For long distance travel, the supporting and restraining chains 312 (FIG. 15) may be employed. The raised or lifted position of the generator 21 is indicated in dashed outline at 21''' in FIGS. 12 and 15.

When the site of a proposed seismic survey position is reached, often called the "shot point" the transporter T' is maneuvered into the desired position, and the leg assemblies 274a-d are actuated by their respective hydraulic cylinders 280 so as to position the footpads 288 down into respective, firm contact with the earth's surface S. Thereafter, the hydraulic lift cylinders 204a, b are actuated to lower their respective piston rods 218a, b which are connected to the plate assembly 30 through the shock absorbers 232a, b. It is noted that the generator 21 is being lowered while in its vertical position. The head spaces 230 (FIG. 18) of the lift cylinders are pressurized so as to apply a very large downward force upon the plate assembly 30, for causing the blades 156 to be driven down firmly embedded into the earth's surface S. When the ground plate assembly 30 has thereby been suitably positioned, the hydraulic cylinders 248, 248' are actuated to retract the clamp heads 252, 252' from the bearing block 224. This unclamping of the lower ends of the lift cylinders 204a, b, serves to isolate the transporter T' from much of the mechanical shock created at each firing of the seismic energy generator 21.

The seismic energy generator 21 is then fired while in its vertical position in the same manner as previously described for transmitting essentially pure compression (P) waves down into the earth. It may be fired several times while vertical and with the first powerful impulse, the blades 156, become even more firmly embedded down into the earth for obtaining firm coupling to the earth's surface S. Powerful essentially pure compression (P) waves 164 (FIGS. 7 and 8) are thereby being transmitted down into the earth. The shock absorbers 232 which are connected between lift piston rods 218 and the plate assembly 30 buffer the effect on the transporter, partially due to the normal resiliency of the pads 238 and also through the ability of the whole buffer pad 242 to move upward relative to the housing 234 and through the ability of the collars 272a, b to slide freely along their respective piston rods 218a, b.

When the operator is satisfied with the number of compression (P) wave "shots" produced while the generator 21 is in the vertical position, the operator then proceeds to generate combinations of horizontally polarized shear (SH) waves 166 (FIGS. 7 and 8) and compression (P) waves 164 by tilting the seismic energy generator 21 to the left or to the right at any desired inclination between the extreme positions illustrated by the dashed lines 21' and 21'' of FIGS. 14 and 15 and then firing it while it remains tilted.

This tilting is accomplished by means of the tilt cylinders 254a, b. The operation of the tilt cylinders 254 is best illustrated in FIG. 17. As previously explained, the piston rods 268 of the tilt cylinders are connected by pivots 264 to fixed arms 262, which extend laterally outwardly from the center line of the bearing assembly 26 around which the seismic energy generator 21 is tilted. When the generator 21 is upright, as shown in FIG. 15, the piston rod of each tilt cylinder 254 is partially extended. If the piston rod is thereupon retracted, the length of the link between the lower pivot pin 264 and the upper pivot pin 260 becomes shortened, causing the entire seismic energy generator 21 to be tilted to the right, as illustrated in FIG. 17 and as shown in FIG. 15 at 21''. Conversely, extension of the piston rod, as shown at the left in FIG. 17, causes the link between pivots 264 and 260 to become lengthened for causing the generator to be tilted toward the left-leaning position 21' (FIGS. 14, 15). As the tilt cylinder piston rods are extended and retracted, the upper pivot pin 260 will follow a path in a circular arc "m" about the axis of the bearing assembly 26, as shown dashed in FIG. 17.

Advantageously, this convenient lifting, lowering and tilting enables the operator at one and the same shot point to transmit pure compressional (P) waves and then soon after to transmit left-handed (or right-handed) horizontally polarized shear (SH) waves in combination with compression (P) waves and then soon after to transmit the other handed horizontally polarized shear (SH) waves in combination with compression (P) waves. Thus, a large amount of many different types of seismic data can be obtained at the same shot point in a time period of relatively few minutes by this seismic exploration method and system.

Ground Plate Assembly Modifications

FIGS. 19-21 illustrate three modifications of ground plate assemblies which may be employed in various types of terrain to enhance the coupling between the seismic energy generator 21 and the ground. Plate assembly 30A shown in FIG. 19 includes the disc 144 and teeth 156 previously described but includes, in addition, a sharpened, circular peripheral blade 292 encircling the blades 156. Openings 294 in the disc 144 between the respective blades 156 communicate with a vacuum chamber 296 which is connected by a suction line 298 through a filter 300 to a vacuum pump 302. This vacuum chamber 296 is located in the spaces between the stiffening ribs 146 (FIGS. 2, 3 and 6) and the transverse ribs 148 (FIG. 3). Connected into the suction line 298 is a solenoid-operated vacuum break valve 304 which has a port 305 communicating with the atmosphere, as indicated by the arrow 307. It will be understood that, after forcing the blades 156 and the surrounding peripheral blade 292 down into the earth, a vacuum created in the chamber 296 will serve to enhance the coupling between the plate assembly 30A and the earth.

FIGS. 20 and 21 illustrate modifications which may be employed on paved surfaces, such as roads R, without damaging them. Plate assembly 30B of FIG. 20 also employs a vacuum chamber 296. Instead of penetrating blades, however, the lower surface of the disc 144 utilizes a contact member 306 having multiple small blunt teeth 311 with passages 294 between these teeth through which vacuum may be applied to the surface of the road R. A circular, resilient skirt-like flange 308 encircles the plate assembly 30B to provide a vacuum seal. Inside of this resilient skirt 308 there is a mass of resilient, closed-cell foam 315 for increasing the effectiveness of the vacuum seal with the surface of the road. FIG. 21 differs from FIG. 20 in that the plate assembly 30C has a circular resilient tube-like inflatable boot 310 extending around beneath the periphery of the plate assembly 30C to provide a vacuum seal.

It is believed that the many advantages of this invention will now be apparent to those skilled in the art. It will also be apparent that a number of variations and modifications may be made in this invention without departing from its spirit and scope. For example, the foregoing description assumes the use of air as the gaseous medium. However, any gas may be employed including, for example, nitrogen or steam. Accordingly, the foregoing description is to be construed as illustrative only, rather than limiting. This invention is limited only by the scope of the following claims and reasonable equivalents of the claimed elements.

I claim:

1. Apparatus for generating horizontally polarized shear waves and compression waves in the earth for seismic surveying which comprises:
    transport means movable across the earth's surface;
    substantially vertical hollow cylinder means carried by said transport means, having a wall and closed upper and lower ends;
    an earth-contacting plate pivotally mounted to the lower end of said cylinder means for pivoting in an arc direction about an axis substantially perpendicular to the axis of said cylinder means and parallel with the earth's surface and said pivot axis being at the lower end of said cylinder means near said earth-contacting plate, said plate having an earth-contacting surface including a plurality of blade members engageable with the earth's surface;
    a piston-like reaction mass slidably contained within said cylinder means;
    a liquid contained within said cylinder means forming a liquid-filled volume substantially filling the cylinder means between the lower end of the cylinder means and the reaction mass; and
    air gun means contained within said cylinder means between the lower end of said cylinder means and the reaction mass and extending transverse to the axis of said cylinder means, with the axis of the air gun being oriented parallel with said pivot axis, for suddenly discharging an explosive-like burst of expanding compressed gas within said liquid-filled volume, the lower end of said cylinder means serving to focus and direct the burst upwardly toward the reaction mass and forcibly drive the earth-contacting plate down onto the earth's surface.

2. The apparatus of claim 1 wherein said transport means comprises means for supporting said cylinder means at a selected, variable, angle to the earth's surface up to a maximum of approximately 50° away from vertical.

3. The apparatus of claim 2 wherein said blade members are substantially perpendicular to the plane of said selected angle.

4. The apparatus of claim 1 wherein the inner lower end of said cylinder means is concave.

5. The apparatus of claim 4 wherein said concave end is substantially conical.

6. The apparatus of claim 1 wherein said cylinder means includes exhaust openings in its wall positioned to be uncovered by upward motion of said reaction mass.

7. The apparatus of claim 6 wherein said cylinder means includes a manifold connected to receive fluid from said exhaust openings.

8. The apparatus of claim 7 wherein said transport means includes a liquid from gas separator connected to receive the fluid from said manifold.

9. The apparatus of claim 8 comprising a pump for returning liquid from said separator to said cylinder means.

10. A seismic energy generating and transmitting system for transmitting into the earth compression waves and horizontally polarized shear waves comprising:
    a seismic energy generator having an upwardly-downwardly extending axis and generating a powerful explosive-like thrust directed in a downward direction along said axis whenever said generator is fired;
    a rigid ground plate positioned below said generator and having earth gripping means thereon adapted for contacting the earth's surface in gripping relationship;
    a pivot connection between said ground plate and said generator;
    the axis of said pivot connection being horizontal and being perpendicular to the axis of said generator for transmitting said powerful thrust downwardly from said generator through said pivot connection and thence through said ground plate into the earth;
    a transporter movable across the earth's surface having a load-bearing framework;
    lift means mounted on said framework for raising and for lowering said ground plate together with said pivot connection and said generator for placing said ground plate down onto the earth's surface with said gripping means in gripping relationship with the earth's surface and for raising said ground plate away from the earth's surface and
    tilt means for tilting said generator about said horizontal axis while said ground plate gripping means are engaging the earth's surface for orienting the generator axis vertically while said generator is fired for transmitting compression (P) waves into the earth and for inclining the generator axis away from vertical in a first direction while said generator is fired for transmitting into the earth first horizontally polarized shear (SH) waves together with compression (P) waves and for inclining the generator axis away from vertical in a second direction opposite to said first direction while said generator is fired for transmitting into the earth second horizontally polarized shear (SH) waves in an opposite shear direction from said first horizontally polarized shear waves together with compression (P) waves;

said tilt means includes a lever member connected to said generator near said horizontal axis;

a slidable coupling connecting an upper portion of said lever member to said lift means for permitting upward and downward movement of said lever member relative to said lift means while preventing said upper portion from moving in a horizontal direction relative to said lift means;

said lever member includes a second portion projecting out of the plane defined by said generator axis and said horizontal axis;

said tilt means also includes an elongated extendible and retractable linkage pivotally connected at one end to the outer end of said second portion of the lever member; and said extendible and retractable linkage is pivotally connected at its other end to an upper portion of said generator.

11. A seismic energy generating and transmitting system as claimed in claim 10, in which:
said horizontal pivot axis extends in the fore and aft direction with respect to said transporter; and
said tilt means inclines said generator to left and right with respect to said fore and aft direction.

12. A seismic energy generating and transmitting system as claimed in claim 11, in which:
said generator is mounted within a compartment in said transporter having side openings located to left and right of said generator for accommodating the leftward and rightward inclination of said generator.

13. A seismic generating and transmitting system as claimed in claim 10, in which:
said load-bearing framework extends up to an overhead portion located at a higher elevation than said generator;
said lift means includes an elongated extendible and retractable linkage having upper and lower ends;
said upper end of said lift means being pivotally connected to said overhead portion of said framework;
said lower end of said lift means being connected to said ground plate; and
said slidable coupling is a collar encircling an intermediate portion of said extendible/retractable linkage of said lift means.

14. A seismic generating and transmitting system as claimed in claim 13, in which:
restraining clamp means are mounted on said framework at an elevation above said collar for releasably engaging said extendible and retractable linkage of said lift means for restraining said linkage against lateral motion whenever said clamp means are engaging said linkage.

15. A seismic generating and transmitting system as claimed in claim 10, in which:

said load-bearing framework includes an overhead portion located above said generator;
said lift means comprise first and second elongated extendible and retractable linkages each having upper and lower ends;
said first and second linkages of said lift means are located on opposite sides of said generator;
said upper ends of said linkages of said lift means are pivotally connected to said overhead portion of said framework;
said lower ends of said lift means are connected to said ground plate on opposite sides of said pivot connection in alignment with said horizontal axis; and
restraining clamp means mounted on said framework at an intermediate elevation for releasably engaging intermediate portions of said first and second linkages for restraining said linkages against horizontal movement relative to said framework whenever said clamp means are engaged therewith.

16. A seismic energy generating and transmitting system as claimed in claim 15, in which:
said lower ends of said first and second linkages of said lift means are connected to said ground plate by first and second shock absorbers, respectively, said shock absorbers being aligned with said horizontal axis and being located near opposite ends of said pivot connection.

17. A seismic energy generating and transmitting system as claimed in claim 16, in which:
said horizontal axis extends fore and aft; and
said first and second linkages of said lift means are located forward and rearward of said generator, respectively.

18. A seismic generating and transmitting system as claimed in claim 15, in which:
said tilt means include a first and second lever member connected to said generator near said horizontal axis near opposite ends of said pivot connection;
a first and a second coupling respectively connecting an upper portion of each lever member to said first and second linkages of said lift means for permitting upward and downward movement of said lever members relative to linkages while preventing said upper portions from moving in a horizontal direction relative to said linkages;
each said lever member includes a lateral portion projecting out of the plane defined by said generator axis and said horizontal axis;
said tilt means also include first and second elongated extendible and retractable linkages each pivotally connected at their lower ends to the outer end of said lateral portions of the first and second lever members, respectively; and
said linkages of said tilt means are each pivotally connected at their other ends to upper portions of said generator on opposite sides of said generator.

19. A seismic generating and transmitting system as claimed in claim 18, in which:
each said slidable coupling is a collar encircling an intermediate portion of said first and second extendible and retractable linkages, respectively, of said lift means.

20. A seismic generating and transmitting system as claimed in claim 10, in which:
said gripping means comprise a plurality of passages extending through said ground plate from bottom to top;

a suction chamber communicating with the upper ends of said passages;

a vacuum pump connected to said suction chamber for creating a reduced pressure therein below atmospheric pressure; and a peripheral seal means extending around the perimeter of said ground plate for establishing a vacuum seal with the earth.

21. A seismic generating and transmitting system as claimed in claim 20, in which:

said peripheral seal means is a continuous blade of generally cylindrical configuration and having a sharpened lower edge for penetrating into the earth.

22. A seismic generating and transmitting system as claimed in claim 20, in which:

said peripheral seal means are resilient.

23. A seismic generating and transmitting system as claimed in claim 22, in which:

said resilient seal means includes resilient closed cell material encircled by a flexible skirt-like flange.

24. A seismic generating and transmitting system as claimed in claim 22, in which:

said resilient seal means includes a tube-like inflatable boot extending around beneath the periphery of said ground plate.

25. A discharge container for an air gun for generating waves in the earth, comprising:

an elongate cylinder having a circular cylindrical wall with an upper end and a lower end;

said upper end including means for attaching a cover plate;

said lower end including means for attaching a cylinder head;

said circular cylindrical wall having a lower thickened wall portion; and an annular manifold assembly extending circumferentially around said circular cylindrical wall at said thickened wall portion communicating with the cylinder;

said lower thickened wall portion includes a plurality of circumferentially spaced holes spaced above the lower end of said cylinder for providing communication between the interior of the circular cylindrical wall and said annular manifold assembly;

said means for attaching the cylinder head to said lower end of the elongate cylinder includes external flange means;

said annular manifold assembly includes a cylindrical outer wall affixed at one end to said external flange means and extending upwardly therefrom in spaced relationship with said thickened wall portion of said circular cylindrical wall;

an upper annular radial wall affixed to said cylindrical outer wall and said circular cylindrical wall to form an annular space;

a lower annular radial wall affixed to said cylindrical outer wall and said circular cylindrical wall to divide the annular space and form a ring-shaped manifold chamber and lower passages with said lower annular radial wall defining the bottom of said ring-shaped manifold chamber and said upper annular radial wall forming the top of said ring-shaped manifold chamber; and said ring-shaped manifold chamber including means for coupling to a conduit.

26. The discharge container recited in claim 25, wherein:

said lower annular radial wall includes a plurality of apertures for providing communication between said ring-shaped manifold chamber and said lower passages.

27. The discharge container recited in claim 25, including:

a heavy cylindrical piston-like reaction mass dimensioned to fit in free sliding relationship within said circular cylindrical wall;

bearing means on said heavy cylindrical piston-like reaction mass for sliding contact against the interior of said circular cylindrical wall to allow free sliding movement of said heavy cylindrical piston-like reaction mass relative to the interior of said circular cylindrical wall.

28. The discharge container recited in claim 25, including:

a cover plate including a check valve and discharge conduit coupling means.

29. The discharge container recited in claim 25, wherein:

said cylindrical outer wall is segmented below said lower annular radial wall to form niches.

30. The discharge container recited in claim 25, including:

said means for attaching the cylinder head to said lower end of the elongate cylinder includes external flange means;

a cylinder head mechanically coupled to said elongate cylinder at said exterior flange means.

31. The discharge container recited in claim 30, wherein:

said cylinder head includes an opening for receiving therein a cylindrical air gun assembly;

said cylinder head is configured to direct the force of the high pressure gas discharge from the air gun assembly upward into said elongate cylinder.

32. A surface contacting plate for transmitting into the earth the shock waves from the sudden discharge of pressurized gas from an air gun, comprising:

a disc-shaped plate member having a plurality of parallel projections depending therefrom to engage the surface of the earth in close coupling contact;

coupling means affixed to said disc-shaped plate member and extending upwardly therefrom for mechanical coupling to a cylinder head of a discharge chamber for an air gun;

transverse reinforcing means affixed to the upper surface of said disc-shaped plate member for adding strength to said disc-shaped plate member;

said projections of said disc-shaped plate member include a plurality of spaced blades having narrow triangular cross-sectional earth penetrating configuration for biting into and gripping the earth for transferring horizontally polarized shear waves into the earth;

a peripheral blade affixed to said disc-shaped plate which encircles said plurality of spaced blades;

openings positioned between said uniformly spaced blades;

a vacuum chamber formed in said disc-shaped plate;

said openings providing communication between said vacuum chamber and the bottom of said disc-shaped plate; and vacuum coupling means formed in said vacuum chamber for receiving a suction line.

33. A surface contacting plate for transmitting into the earth the shock waves from the sudden discharge of pressurized gas from an air gun, comprising:

a disc-shaped plate member having a plurality of projections depending therefrom to engage the surface of the earth in close coupling contact;

coupling means affixed to said disc-shaped plate member and extending upwardly therefrom for mechanical coupling to a cylinder head of a discharge chamber for an air gun;

transverse reinforcing means affixed to the upper surface of said disc-shaped plate member for adding strength to said disc-shaped plate member;

said projections of said disc-shaped plate member include a plurality of spaced blades having a narrow triangular cross-sectional earth penetrating configuration for biting into and gripping the earth for transferring horizontally polarized shear waves into the earth;

a resilient peripheral flange affixed to said disc-shaped plate member which encircles said projections to provide a vacuum seal when said disc-shaped plate member is placed in contact with the surface of the earth;

openings positioned between said projections;

a vacuum chamber formed in said disc-shaped plate;

said openings providing communication between said vacuum chamber and the bottom of said disc-shaped plate; and vacuum coupling means formed in said vacuum chamber for receiving a suction line.

34. The surface contacting plate recited in claim 33, including:

an inner resilient peripheral mass of closed-cell material adjacent said resilient peripheral flange for increasing the effectiveness of the vacuum seal with the surface.

35. An air gun assembly incorporated into a cylinder head of a discharge container for generating waves in the earth, comprising:

a cylindrical casing extending transversely through said cylinder head, said cylindrical casing having an intermediate region communicating with said discharge container;

a substantially cylindrical three-chamber housing fitting into said cylindrical casing, said three-chamber housing including a first housing which defines a firing chamber, said first housing having a mating end, and a second housing which defines an operating chamber and a central chamber, said second housing having a mating end for mating with said mating end of said first housing;

said firing chamber including a pressurized gas charging passage;

said second housing including a plurality of discharge ports communicating with said central chamber;

annular sealing means axially located within said second housing and abutting against said first housing at its mating end;

means for holding said annular sealing means in position against said first housing at its mating end;

shuttle means positioned within said central chamber, said shuttle means including a shank portion having an axial passage for supplying pressurized gas from said firing chamber to said operating chamber, an operating piston and a firing piston interconnected by said shank portion, said firing piston being seated against said annular sealing means and said operating piston closely abutting a partition which separates said operating chamber from said central chamber when said shuttle means is in it initial position;

said operating chamber including a firing-trigger passage leading thereto adapted for causing a sudden discharge of pressurized gas through said discharge ports upon opening of said firing-trigger passage after said firing chamber and said operating chamber have been charged with pressurized gas; and said discharge ports being located in said intermediate region of said cylindrical casing for causing said sudden discharge to enter said discharge container.

36. The air gun assembly recited in claim 35, including:

second means positioned in said operating chamber for holding said partition in position.

37. The air gun assembly recited in claim 35, wherein:

said second housing includes a valve chamber for receiving a valve which normally closes said firing-trigger passage.

38. The air gun assembly recited in claim 35, including:

a first end cap for said first housing;

a second end cap for said second housing.

39. The air gun assembly recited in claim 35, wherein:

said first and second housings are dimensioned to fit within a cylindrical casing coupled to a cylinder head.

40. The air gun assembly recited in claim 39, wherein:

said cylindrical casing is located at the apex of a conically-shaped cylinder head.

41. Force transmitting apparatus for transmitting a sudden shock resulting from discharging an air gun in a container to a contact member closely coupled to the surface of the earth, comprising:

a substantially vertical upright elongated cylindrical container for containing liquid, said substantially vertical upright elongated cylindrical container having a cylinder axis, said substantially vertical upright elongated cylindrical container having a rigidly closed lower end, an elongated air gun having a longitudinal axis, said elongated air gun being mounted in said rigidly closed lower end with said longitudinal axis of said air gun being perpendicular to said cylinder axis of said substantially vertical upright elongated cylindrical container, said air gun having at least one air discharge port communicating with liquid in said substantially vertical upright elongated cylindrical container, pivot coupling means attached to said rigidly closed lower end of said substantially vertical upright elongated cylindrical container, said pivot coupling means having an axis of rotation extending perpendicular to said cylinder axis of said substantially vertical upright elongated cylindrical container, a rigid ground contact member including multiple depending projections for engaging into the earth, and said rigid ground contact member being attached to said pivot coupling means for enabling said substantially vertical upright elongated cylindrical container to be inclined away from vertical for generating compressional waves and horizontally polarized shear waves in the earth upon discharging the air gun with said substantially vertical upright elongated cylindrical container inclined away from vertical.

42. The force transmitting apparatus recited in claim 41, wherein:
said contact member includes depending projections arranged so that their longitudinal axes are parallel to one another and parallel to the longitudinal axis of said rigid pivot shaft means.

43. A system for transmitting shear waves and compression waves into the earth for obtaining information about the geological features in the earth, comprising:
a seismic energy discharge chamber closed by a head portion shaped to direct the discharge of pressurized gas upwardly from an air gun;
a reaction mass positioned within said seismic energy discharge chamber for sliding upward movement therein in response to the sudden discharge of pressurized gas from the air gun;
rigid pivot shaft means;
coupling means fixedly coupled to said seismic energy discharge chamber and pivotally coupled to said rigid pivot shaft means;
surface contacting plate means affixed to said rigid pivot shaft means so that said seismic energy discharge chamber may be pivoted about said rigid pivot shaft means relative to said surface contacting plate means to generate a downwardly inclined thrust relative to the surface of the earth which thrust has a vertical component for providing compression waves and a horizontal component for providing horizontally polarized shear waves;
said seismic energy discharge chamber includes an incompressible liquid and said head portion is conically shaped to direct the thrust of the pressurized gas discharge upwardly toward said reaction mass;
said surface contacting plate means includes depending projections for contact with the surface of the earth; and
said rigid pivot shaft means and the air gun have their longitudinal axes located parallel to one another and in the same plane.

44. The system recited in claim 43, wherein:
said depending projections have their longitudinal axis spaced parallel to one another in the same plane, and their longitudinal axes are parallel to the longitudinal axis of said rigid pivot shaft means.

45. The system recited in claim 43, including:
gas and water discharge outlet means in said seismic energy discharge chamber;
water inlet means in said seismic energy discharge chamber;
pressurized gas inlet means coupled to the air gun.

46. The system recited in claim 43, wherein:
said seismic energy discharge chamber has a thickened lower wall portion.

47. The system recited in claim 43, including:
vacuum inlet means in said surface contacting plate means for creating a vacuum between the bottom of said surface contacting plate means and the surface of the earth to enhance the coupling between the surface of the earth and said surface contacting plate means.

48. The system recited in claim 47, including:
a peripheral vacuum seal encircling said surface contacting plate means to provide a vacuum seal between the surface of the earth and said surface contacting plate means.

49. The system recited in claim 48, wherein:
said peripheral vacuum seal includes a sharpened peripheral blade for penetration into the surface of the earth.

50. The system recited in claim 48, wherein:
said peripheral vacuum seal includes a resilient skirt-like flange.

51. The system recited in claim 48, wherein:
said peripheral vacuum seal includes a tube-like inflatable boot.

52. A cylinder head and air gun casing assembly for an air gun discharge container for generating waves in the earth comprising:
a diverging generally concave wall having an apex portion and a base portion;
mounting means on said base portion for attachment with a mating portion of a discharge container with the concave inner surface of said wall facing toward a discharge container mountable on said base portion;
a cylindrical air gun casing having its cylindrical axis extending perpendicularly to and intersecting with the axis of said generally concave wall;
said cylindrical air gun casing intersecting with said concave wall near said apex portion with the opposite ends of said cylindrical casing extending outwardly from the exterior of the generally concave wall, and
said cylindrical air gun casing having at least one air gun discharge port therein located near the axis of said generally concave wall and aimed along the axis of said concave wall for directing the discharge from the port toward a discharge container mountable on said base portion.

53. A cylinder head and air gun casing assembly for an air gun discharge container recited in claim 52, in which:
said cylindrical air gun casing includes a plurality of air gun discharge ports located near the axis of said generally concave wall;
one of said ports is aimed in one direction along the sloping inner surface of the generally concave wall;
another of said ports is aimed in the opposite direction along the sloping inner surface of said generally concave wall for causing said generally concave wall to direct the discharge from both of said ports toward a discharge container mountable on said base portion.

54. A cylinder head and air gun casing assembly for an air gun discharge container as recited in claim 52, in which:
said cylindrical air gun casing includes three air gun discharge ports located near the axis of said generally concave wall;
one of said ports is aimed in one direction along the sloping inner surface of the generally concave wall;
a second of said ports is aimed in the opposite direction along the sloping inner surface of the generally concave wall, and
the third of said ports is located between the other two and is aimed away from the apex portion in a direction generally parallel with the axis of the generally concave wall for directing the discharge from all of said ports toward the interior of the mating portion of a discharge container mountable on said base portion.

55. A cylinder head and airgun casing assembly for an airgun discharge container as recited in claim 54, in which:
   a cylindrical bearing is mounted on said apex portion;
   said cylindrical bearing is positioned farther away from said base portion than said cylindrical airgun casing, and
   said cylindrical bearing has its cylindrical axis positioned parallel with the cylindrical axis of said airgun casing and also has its cylindrical axis intersecting with the axis of said generally concave wall.

56. A cylinder head and airgun casing assembly for an airgun discharge container as recited in claim 55, in which:
   said cylindrical bearing is attached to a plate assembly adapted to be placed in contact with the surface of the earth for transmitting a powerful thrust into the earth resulting from discharge of the airgun.

57. A cylinder head and airgun casing assembly for an airgun discharge container as recited in claim 52, in which:
   a cylindrical bearing is mounted on said apex portion;
   said cylindrical bearing is positioned farther away from said base portion than said cylindrical airgun casing, and
   said cylindrical bearing has its cylindrical axis intersecting with the axis of said generally concave wall.

58. A cylinder head and airgun casing assembly for an airgun discharge container as recited in claim 57, in which:
   said cylindrical bearing is attached to a plate assembly adapted to be placed in contact with the surface of the earth for transmitting a powerful thrust into the earth resulting from discharge of the airgun.

* * * * *